United States Patent [19]
Izumi et al.

[11] Patent Number: 5,812,226
[45] Date of Patent: Sep. 22, 1998

[54] LIQUID CRYSTAL DISPLAY FORMED BY A PLURALITY OF NON-ELECTRICALLY INTERCONNECTED LIQUID CRYSTAL DISPLAY PANELS

[75] Inventors: Yoshihiro Izumi, Kashihara; Sayuri Fujiwara; Tokihiko Shinomiya, both of Nara, all of Japan

[73] Assignee: Sharp Kabushiki Kaisha, Osaka, Japan

[21] Appl. No.: 868,481

[22] Filed: Jun. 3, 1997

Related U.S. Application Data

[63] Continuation of Ser. No. 468,649, Jun. 6, 1995, abandoned.

[30] Foreign Application Priority Data

Sep. 2, 1994 [JP] Japan .................................. 6-210216
Feb. 17, 1995 [JP] Japan .................................. 7-029395

[51] Int. Cl.$^6$ ...................................................... G02F 1/133
[52] U.S. Cl. ...................................................... 349/73
[58] Field of Search .......................... 359/82, 83, 64, 359/53; 349/73

[56] References Cited

U.S. PATENT DOCUMENTS

| | | | |
|---|---|---|---|
| 4,408,836 | 10/1983 | Kikuno | 359/82 |
| 4,515,440 | 5/1985 | Mosier | 359/84 |
| 4,591,240 | 5/1986 | Masaki et al. | 359/67 |
| 4,733,948 | 3/1988 | Kitahara | 359/67 |
| 4,906,071 | 3/1990 | Takahara et al. | 359/82 |
| 5,106,197 | 4/1992 | Ohuchida et al. | 359/83 |
| 5,164,853 | 11/1992 | Shimazaki | 359/82 |

FOREIGN PATENT DOCUMENTS

| | | |
|---|---|---|
| 1-213621 | 8/1989 | Japan . |
| 5-19346 | 1/1993 | Japan . |
| 5-19347 | 1/1993 | Japan . |
| 5-127605 | 5/1993 | Japan . |
| 5-188340 | 7/1993 | Japan . |
| 5-341310 | 12/1993 | Japan . |
| 6-95130 | 4/1994 | Japan . |
| 6-17178 | 5/1994 | Japan . |

*Primary Examiner*—William L. Sikes
*Assistant Examiner*—James A. Dudek
*Attorney, Agent, or Firm*—David G. Conlin; Brian L. Michaelis

[57] ABSTRACT

A liquid crystal display comprising a plurality of liquid crystal panels placed on a single plane of a large substrate, and a black matrix made of a photo-absorbing film that shows black when having absorbed light. Two polarizing plates are respectively placed to cover the front and rear surface of a set of liquid crystal panels almost entirely in such a manner that their polarizing axes intersect at right angles. The resulting multi-screen liquid crystal display consumes less power, retains excellent display quality, and makes the joints between the liquid crystal panels difficult to see.

53 Claims, 13 Drawing Sheets

$\sin\theta 1 = n \sin\theta 2$

LIQUID CRYSTAL DISPLAY FORMED BY A PLURALITY OF NON-ELECTRICALLY INTERCONNECTED LIQUID CRYSTAL DISPLAY PANELS

This application is a continuation of Pat. No. 08/468,649, filed Jun. 6, 1995, abandoned.

FIELD OF THE INVENTION

The present invention relates to a liquid crystal display used for AV (audiovisual) systems or OA (office automation) systems.

BACKGROUND OF THE INVENTION

Recently, the need for a high-definition large-screen display which is lighter, thinner and less-power-consuming has been increasing for a TV set representing the AV systems intended for home use or the OA systems. For this reason, the development of the large-screen displays including a CRT (cathode ray tube), an LCD (liquid crystal display), a PDP (plasma display panel), an EL (electroluminescent) display, and an LED (light emitting display) has been proceeding toward practical use.

Of all types of displays, the liquid crystal display is most advantageous in that: it has the least depth (thickness); it consumes less power; and it easily displays full color images. Thus, the liquid crystal display has been applied to various fields these days and the development of a practical large-screen liquid crystal display has long been expected.

However, it is known that the mortality rate of the liquid crystal display surges when the screen thereof is upsized because of the signal disconnection or imperfect pixels caused during the manufacturing process. Besides, there occurs a problem such a large-screen liquid crystal display is expensive. To eliminate these problems, the screen is upsized by connecting a plurality of liquid crystal displays to form a single multi-screen liquid crystal display.

However, simply connecting the plurality of liquid crystal panels to form the multi-screen liquid crystal display causes light leakage from the back light through the spaces of the connected parts, thereby making the joints between the liquid crystal panels easy to see.

Thus, it is necessary to make the joints between the display screens difficult to see to display a natural large-sized image. To be more specific, following multi-screen display methods have been proposed.

PRIOR ART A

Japanese Laid-Open Patent Application Nos. 1-213621/1989 and 5-127605/1993 disclose a large-screen liquid crystal display of a direct sight type. As shown in FIG. 15, in a liquid crystal display 101 disclosed in Japanese Laid-Open Patent Application No. 5-127605, transparent electrodes 103, color filters 104, and a glass substrate 105 are sequentially layered on a polymer dispersed type liquid crystal layer 102, and each liquid crystal display element 114 is formed by placing a matrix array which comprises a TFT (Thin Film Transistor) 106 composed of a source electrode 107, a drain electrode 108, a gate electrode 109, and an amorphous silicon 110, and a pixel unit 111 on a gate insulating film 112 and a glass substrate 113. The screen is upsized by aligning and connecting a plurality of the liquid crystal display elements 114 on a single surface of a glass reinforcing panel 115.

PRIOR ART B

As shown in FIG. 16, a liquid crystal display 120 disclosed in Japanese Examined Utility Model Publication No.6-17178/1994 upsizes the screen by connecting a plurality of liquid crystal panels 121 on a reinforcing plate 123, and providing blindfold layers 122 to cover the spaces on the reinforcing plate 123 at the joints between the liquid crystal panels 121.

PRIOR ART C

FIG. 17 shows the structure of a liquid crystal display disclosed in Japanese Laid-Open Patent Application Nos. 5-188340/1993 and 5-341310/1993. A liquid crystal display 130 comprises a plurality of irradiating means and a plurality of image enlarging means or image parallel-moving means: the former are represented by a plurality of light sources 132 provided on liquid panels 131 in the matching number, respectively, and the latter are represented by a plurality of refraction factor distributing lens groups 133, a plurality of Frenel's lenses 134, and a screen 135. Herein, a plurality of display images projected onto the screen 135 are connected on the same, thereby realizing a large-screen liquid crystal display of a rear project type that makes the joints difficult to see.

PRIOR ART D

FIG. 18 depicts the structure of a liquid crystal display disclosed in Japanese Laid-Open Patent Application Nos. 5-19346/1993 and 5-19347/1993. A liquid crystal display 140 comprises a plurality of image display units 147 of a project type and a screen 148: each image display unit 147 includes a project lens 142 having a variable aperture 141, a liquid crystal bulb 143, a field lens 144, a concave reflecting mirror 145, and a light source lamp 146. The image display units 147 are arranged in rows and columns to form a large-screen liquid crystal display of a front project type. Herein, the viewing angle of each image display unit 147 in two rows is turned upside down or the intensity thereof is adjusted to be even to form an image on which the joints are difficult to see.

However, the liquid crystal display of the prior art C, which is in effect a rear projector that projects an image on the rear surface of the screen, demands a screen that has light scattering and semi-transmitting properties, thereby presenting a problem that the contrast blurs.

Also, since a lens series is used as the image enlarging means or image parallel-moving means, the efficiency in terms of light utilization decreases. Thus, to eliminate this drawbacks, the liquid crystal display demands a high-intensity irradiating means, which in turn presents a problem that more power is consumed.

Further, providing the lens series increases not only the manufacturing costs, but also the thickness (depth) of the liquid crystal display compared with those of the direct sight type.

The liquid crystal display of the prior art D, which is in effect a front projector that projects an image on the front surface of the screen 148, also demands a screen with light scattering and reflecting properties. Thus, like the liquid crystal display of the prior art C, there occurs problems that the contrast blurs, and that more power is consumed because of the high-intensity project lamp.

In contrast, the liquid crystal displays of the prior arts A and B are of the direct sight type furnished with a back light such as a cold cathode tube on the rear surface of the liquid crystal panels. With this type of liquid crystal display, a viewer can see image data inputted into the liquid crystal panels when the light from the back light is modulated by the liquid crystal panels in accordance with input image data. Thus, unlike the liquid crystal displays of rear project type of the prior art C and those of the front project type of the prior art D, the liquid crystal displays of the prior arts A and B do not demand the screen with the light scattering, semi-transmitting, or reflecting properties, thereby preventing the contrast degradation.

Also, since the liquid crystal displays of the prior arts A and B do not demand the lens series used as the image enlarging means or image parallel-moving means, the light utilization efficiency can be maintained and the high-intensity irradiating means is not necessary, thereby preventing the increase of power consumption. Further, since no lens series is used, the increase in both the manufacturing costs and in thickness (depth) can be prevented.

However, the large multi-screen liquid crystal displays of the prior arts A and B have the following problems.

The liquid crystal display of the prior art A causes a gap of 5–10 μm at the joints between the glass substrates 113 on which the TFT's 106 are formed because of the curvature and difference in thickness. This renders the difference in thickness to the liquid crystal layer 102 sealed in the liquid crystal panel.

It is general that such a difference in thickness of the liquid crystal layer affects the display in a TN (Twist Nematic) liquid crystal display mode known as a typical mode for the TFT-liquid crystal display.

To prevent this problem, Japanese Laid-Open Patent Application No. 5-127605/1993 of the prior art A employs the polymer dispersed type liquid crystal display mode as previously mentioned. However, the liquid crystal display of the direct sight type in the above mode has bad contrast because the image data are displayed by switching between the light transmission and scattering. Also, there is a problem that the power consumption increases because using the polymers demands a higher driving voltage. Thus, the liquid crystal display of the prior art A has a problem that the more power is consumed and can not be regarded as an effective solution.

As previously mentioned, the liquid crystal display of the prior art B provides the blindfold layers 122 on the reinforcing plate 123 when the liquid crystal panels 121 are connected to prevent the light leakage through the spaces therebetween. However, each liquid crystal panel 121 is a glass substrate of, for example, 1.1 mm or 0.7 mm in thickness, and when the viewer sees the liquid crystal display 120 diagonally, the thickness causes a parallax error between the liquid crystal layer displaying an image and the blindfold layers 122. Thus, there occurs a problem that the blindfold layers 122 and hence the joints between the liquid crystal panels 121 stand out if seen diagonally.

SUMMARY OF THE INVENTION

It is therefore the object of the present invention to present a low-power consuming, high-quality liquid crystal display device that can eliminate the problems caused by the multi-screen display method and make the joints between the liquid crystal panels difficult to see.

To fulfill the above object, a liquid crystal display of the present invention includes:

(1) a first polarizing element, which has a first polarizing axis, provided on substantially the entire front surface of the liquid crystal display main body; and (2) a second polarizing element, which has a second polarizing axis that intersects with the first polarizing axis at right angles, provided on substantially the entire rear surface of the liquid crystal display main body.

According to the above structure, a portion where light leaks through the connected parts of the liquid crystal panels shows black under the crossed nicol state of the first and second polarizing elements, thereby making the joints between the liquid crystal panels difficult to see.

It is desirable that the liquid crystal display further includes a first photo-blocking film in matrix which covers the circumference of the pixel electrode of each liquid crystal panel in a predetermined trace width. According to this structure, unwanted light on an area other than the pixel electrodes can be blocked.

Also, it is desirable that the liquid crystal display further includes a second photo-blocking film which covers the liquid crystal display panels on an end surface of the connected part side along the longitudinal direction in a predetermined trace width. According to this structure, even when the viewer sees a display image diagonally, that is to say, he sees that same through the connected parts of the liquid crystal panels from the external of the liquid crystal display, the second photo-blocking film can curb the light leakage caused by the viewing angle characteristics of the above polarizing elements. Thus, not only a portion where light leaks through the connected parts of the liquid crystal panels shows black under the crossed nicol state of the first and second polarizing elements, but also the light leaking through the area other than the pixel electrodes and the connected parts of the liquid crystal panels can be eliminated in all the directions independently of the viewing angle of the viewer, thereby enabling a natural image on which the joints are more difficult to see.

In this case, it is desirable that the first photo-blocking film is made of a photo-absorbing film that shows black when having absorbed light. According to this structure, the surface reflection by the first photo-blocking film can be eliminated, thereby making the joints between the liquid crystal panels more difficult to see.

To fulfill the above object, another liquid crystal display of the present invention includes:

(a) a first photo-blocking film in matrix which covers the circumference of the pixel electrode of each liquid crystal panel in a predetermined trace width; and (b) a third photo-blocking film provided in the connected parts of the liquid crystal panels to fill the spaces of the connected parts.

According to the above structure, unwanted light on an area other than the pixel electrodes can be blocked by the first photo-blocking film, and light passing through the spaces of the connected parts of the liquid crystal panels can be blocked completely by the third photo-blocking film to eliminate the light leakage through the connected parts of the liquid crystal panels completely. Thus, not only the light leakage through the area other than the pixel electrode of each liquid crystal panel 1 but also through the connected parts of the liquid crystal panels can be eliminated completely, thereby enabling a natural image on which the joints are more difficult to see.

It is desirable that the third photo-blocking film is made of an elastic photo-absorbing material because the irregularity, undulation, stress, etc. on the end surface of the connected parts of the liquid crystal panels can be absorbed by the elasticity of the third photo-blocking film. Since the spaces of the connected parts of the liquid crystal panels can be easily filled by the third photo-blocking film along the shape of the end surface of the connected parts of the liquid crystal panels, the spaces of the connected parts of the liquid crystal panels can be filled completely as a result. Thus, the light leakage through the connected parts of the liquid crystal panels can be eliminated completely, and the joints between the liquid crystal panels are made more difficult to see. Note that to fill the spaces of the connected parts completely with ease, it is desirable to use a photo-absorbing material whose elastic coefficient known as Young's coefficient is $10^4$–$10^8$ N/m$^2$, such as a silicon-based rubber, as the elastic photo-absorbing material.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) is a cross sectional view; and FIG. 8(b) is a view explaining how image displaying light passes through the connected parts.

DESCRIPTION OF THE EMBODIMENTS

First Embodiment

An embodiment of the present invention will be explained in the following while referring to FIGS. 1 through 4.

Figure 1:
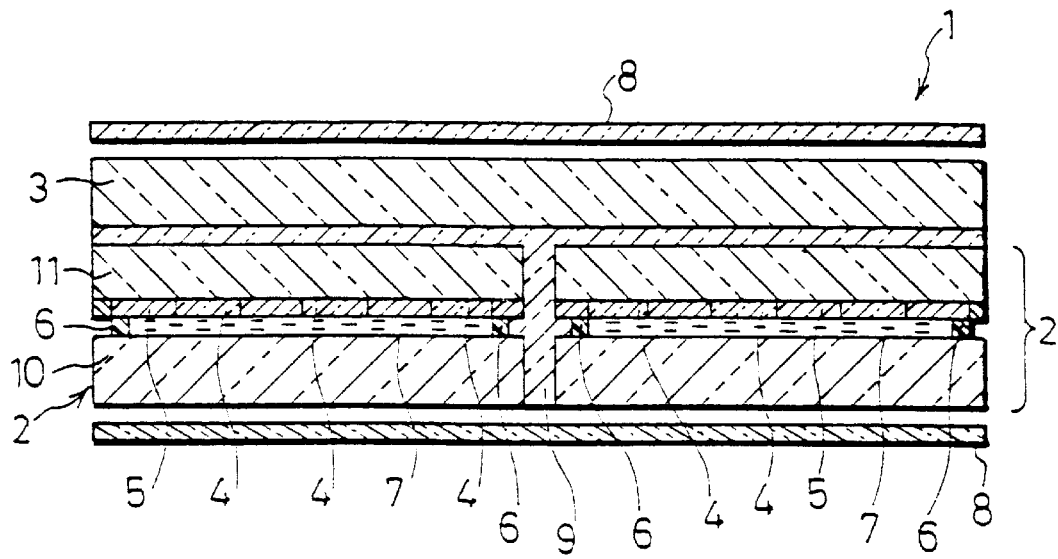
FIG. 1 is a cross sectional view showing the structure of a liquid crystal display in accordance with an embodiment of the present invention.

As shown in FIG. 1, a liquid crystal display 1 of the first embodiment is of the direct sight type. The liquid crystal display 1 comprises a main body and two polarizing plates 8 (polarizing elements). The main body includes a plurality of liquid crystal panels 2 of an active matrix type placed on a single surface of a large substrate 3, and a back light such as a cold cathode tube on the rear surface (lower in the drawing) of the liquid crystal panels 2. The polarizing plates 8 will be described more in detail below. A driver which controls an image signal and the back light are not shown in the drawing. The viewer can see the image data inputted into the liquid crystal panels 2 when the liquid crystal panels 2 modulate the light from the back light in accordance with the input image data.

Figure 2:
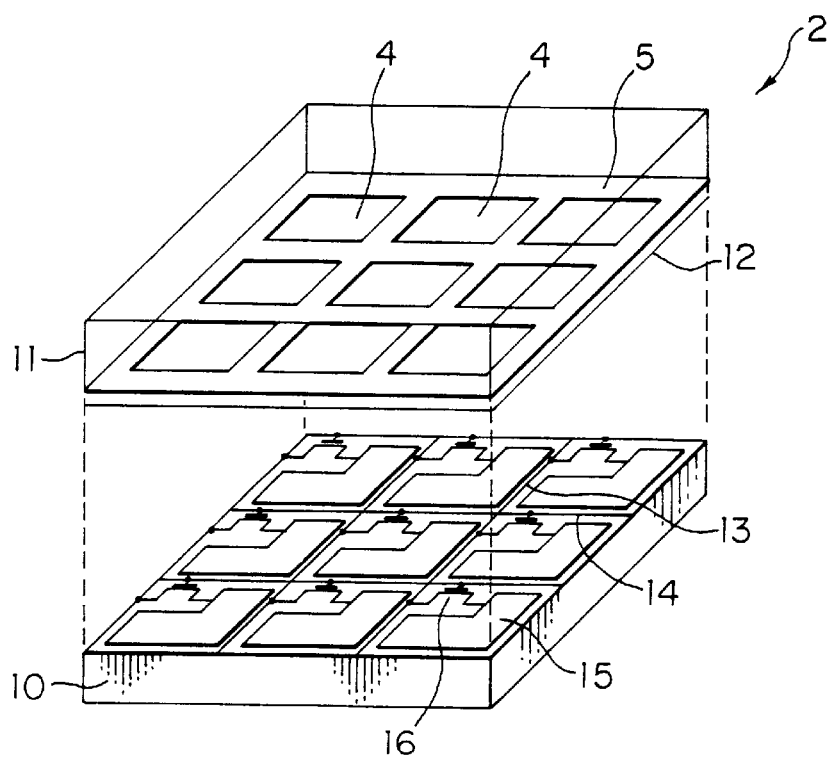
FIG. 2 is a perspective view showing the structure of a liquid crystal panel provided in the liquid crystal display.

As shown in FIG. 2, each liquid crystal panel 2 is of the same structure as a well-known liquid crystal panel of the active matrix type using the active elements in matrix. More specifically, each pixel is provided with a switch that completely cuts an irrelevant signal when it is not selected to eliminate the crosstalk caused between scanning electrodes in case of a simple matrix. The switch is referred to as the active element and the liquid crystal panel thus made is referred to as the active matrix type. The active elements includes 2-terminal elements (diode) and 3-terminal elements (transistor).

On a glass substrate 10 (panel base), scanning electrodes (gate electrodes) 14 and data electrodes (source electrodes) 13 are provided, and a plurality of TFT's (Thin Film Transistors) 16 and a plurality of pixel electrodes 15 are provided at each intersection point of the electrodes 13•14, respectively. TFT 16 is a transistor of an electric filed effect type comprising a semi-conducting thin film such as amorphous silicon (a-Si:H) or polycrystalline silicon (p-Si), and controls the supply of the image signal to the pixel electrodes 15. Each pixel electrode 15 is a transparent conducting film made of ITO (Indium Tin Oxide) or the like when used for a light transmitting type and a reflective conducting film made of aluminum (Al) or the like when used for a reflecting type.

A common electrode 12 is provided on a glass substrate 11 (panel base). In case of color display, color filters 4 for RGB (red, green, and blue) are provided for individual pixel electrodes, respectively, and a black matrix 5 (first photo-blocking film) is provided on the glass substrate 11 to separate the pixels. The black matrix 5 may be provided on the glass substrate 10 instead.

The black matrix 5 is provided so as to cover the circumference of each pixel electrode 15. More precisely, the black matrix 5 is provided to block the light entering to the spaces between the pixel electrodes 15 or the TFT area. This is because if the light passes through the area other than the pixel electrodes 15, the display quality in black degrades, and hence the contrast blurs. Also, if the TFT's 16 receive light, they are photo-excited and a leak current occurs within TFT channels, thereby degrading the display quality. The black matrix 5 is provided to prevent the above problems.

In this embodiment, the black matrix 5 is a photo-absorbing film made of a photo-absorbing material that shows black when having absorbed light. The photo-absorbing material is an organic material, for example, a resin in which a pigment or semi-conducting particulates such as carbon particulates and titanium oxide, respectively, are dispersed, or a non-organic material such as an amorphous film or chromium oxide (CrOx) made of semi-conducting materials belonging to the IV group including silicon (Si), carbon (C), germanium (Ge), and tin (Sn).

The black organic material is advantageous in that it obviates a vacuum device and the photo-absorbing film can be formed by applying the organic material by printing or spin coat, and thus making it easy and inexpensive to form the black matrix 5.

Whereas the semi-conducting materials of the IV group demand the vacuum device such as a CVD (Chemical Vapor Deposition) to form an amorphous thin film; however, it is advantageous in that the resulting black matrix 5 is superior to the one made of the organic material in terms of photo-absorbing coefficient.

For example, in case of light whose wave length is 650nm, the photo-absorbing coefficient of the black organic material made of a carbon particulates dispersed resin is $10^4 (cm^{-1})$, while that of the amorphous thin film (a-SiGe:H) made of Si and Ge is $10^5 (cm^{-1})$.

The liquid crystal panel 2 is formed by laminating the glass substrates 10 to 11 by means of a seal material 6 shown in FIG. 1 in such a manner that the pixel electrodes 15 and common electrode 12 oppose each other, and by filling liquid crystal 7 between the glass substrates 10•11.

It should be noted that the seal 6 must be placed accurately around the pixel poles in the vicinity of the connected parts of the liquid crystals 2. However, if the seal material 6 is a thermosetting resin such as an epoxy resin, the heat sagging of the seal material 6 as a result of the thermosetting causes the orientation failure of the liquid crystal within some hundreds of microns around the seal material 6.

Accordingly, the seal material 6 in this embodiment is either an ultraviolet-ray-setting resin or combination of thermosetting and ultraviolet-ray-setting resin. The ultraviolet-ray-setting resin used herein is, for example, an acrylic- or epoxy- based resin that sets by activating a polymerization initiator when irradiated by an ultraviolet ray. Thus, the seal material 6 does not cause heat sagging, thereby enabling the placement of the seal material 6 around the pixel poles.

FIGS. 3(a) and 3(b) show the two liquid crystal panels 2 thus formed when they are placed on an unillustrated large substrate 3. As shown in FIG. 3(a), each liquid crystal panel 2 is cut at the one side along a cut line 17 drawn near the edge of the image display area, and laminated on the large substrate 3 with the cut portions being connected.

As shown in FIG. 3(b), the liquid crystal panels 2 are connected so that the width b of the space (connected parts) therebetween becomes narrower than the trace width a of the black matrix 5 required for each pixel. Otherwise, the pixel pitch becomes irregular at the connected parts of the liquid crystal panels 2 and makes the image on the screen unnatural.

Thus, cutting the liquid crystal panel 2 demands precise cut line positioning and finishing to the cut surface. Should the cut line 17 of each liquid crystal panel 2 be distorted, or should the cut surface be irregular with projections and depressions of some hundreds of microns in thickness and depth, respectively, the liquid crystal panels 2 are connected with a space wider than the trace width a. However, when the liquid crystal panel 2 is cut by a conventional scribe method, the cut surface is always distorted by some hundreds of microns. Thus, it is preferable to use a dicing device to cut the liquid crystal panel 2 when the precise cut line positioning and finishing to the cut surface are desired. Accordingly, the dicing device is used in this embodiment, and the cut line positioning and finishing are accurate to 50 μm or less and 5 μm or less, respectively, thereby making the joints between the liquid crystal panels 2 narrow. When the width b of the space is narrower than the trace width a of the black matrix 5 as explained above, the pixel pitch is consistent across the entire liquid crystal display 1.

As shown in FIG. 1, when the liquid crystal panels 2 are connected, a refraction factor adjusting material 9 is filled in the connected parts thereof. In this embodiment, the glass substrates 10 and 11 are glass substrates (Corning 7059) whose fraction factors are 1.53. Thus, the fraction factor adjusting material 9 must be made of a material whose fraction factor is also 1.53. It is preferable to use an acrylic-based ultraviolet-ray-setting resin which has a double bond of salt and thiol and sets to have a fraction factor of 1.53 by accelerating polymerization with the cleavage of the double bond when irradiated by the ultraviolet ray. Alternately, a fraction factor adjusting liquid such as a silicon oil having the fraction factor of 1.53 may be used.

The fraction-factor adjusting material 9 may be also used as an adhesive agent to laminate the liquid crystal panels 2 to the large substrate 3.

The liquid crystal display 1 is formed by providing two polarizing plates 8 on the front and rear surfaces of the liquid crystal panels 2 thus connected in such a manner that the polarizing plates 8 cover their respective opposing surfaces almost entirely and their polarizing axes intersect at right angles.

When the multi-screen liquid crystal display is made by simply connecting the liquid crystal panels of the active matrix type using the TFT's, the light from the back light leaks through the connected parts of the liquid crystal panels, thereby making the joints between the liquid crystal panels easy to see.

Figure 4:
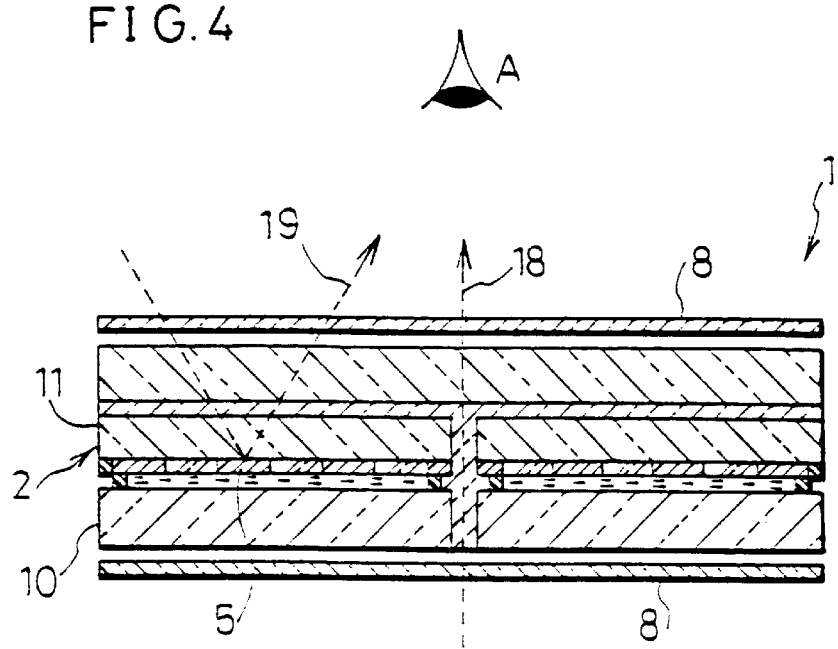
FIG. 4 is a cross sectional view showing how the joints between the liquid crystal displays show.

However, with the liquid crystal display 1 of the first embodiment comprised of the connected liquid crystal panels 2, the polarizing plates 8 are provided to cover the front and rear surfaces of the liquid crystal display 1 almost entirely in such a manner that their polarizing axes intersect at right angles. For this reason, as shown in FIG. 4, light leakage 18 through the connected parts of the liquid crystal panels 2 shows black under the crossed nicol state of the polarizing plates 8. As a result, for a viewer A standing substantially in front of the liquid crystal display 1, the connected parts of the liquid crystal panels 2 show black entirely under the crossed nicol state of the polarizing plates 8, thereby making the joints between the liquid crystal panels difficult to see.

Note that when the black matrix 5 is made of a metal photo-blocking material such as chromium (Cr) and molybdenum (Mo), the effect to make the joints easy to see is weakened because of the contrast between the surface reflection of the black matrix 5 and the color of black shown on the connected parts of the liquid crystal panels 2 under the crossed nicol state of the polarizing plates 8.

However, as has been explained, with the liquid crystal display 1 of the first embodiment, the black matrix 5 is the photo-absorbing film that shows black when having absorbed the light. Thus, reflecting light 19 from the black matrix 5 shows black due to the photo-absorption, meaning that the surface reflection of the black matrix 5 can be reduced. Accordingly, both the light leakage 18 of the back light through the spaces of the connected parts of the liquid crystal panels 2 and reflecting light 19 from the black matrix 5 show black, which makes it difficult to distinguish the same from the background, thereby making the joints between the liquid crystal panels 2 more difficult to see.

Generally, it is difficult to connect a plurality of liquid crystal panels 2 without causing any gap because of the difference of glass substrates in thickness and the curvature thereof. Further, the liquid crystal panels 2 are scratched at the edge by the pitching or the like when they are processed. These gaps at the connected parts and scratches at the edge of the liquid crystal panels cause the light scattering, which makes the joints easy to see.

However, as shown in FIG. 1, with the liquid crystal display 1 of the first embodiment, a plurality of liquid crystal panels 2 are laminated to the large substrate 3. For this reason, if the viewer sees an image through the large substrate 3, the gaps caused by the difference in thickness or curvature, or the scratches are not exposed on the surface of the liquid crystal display 1, thereby enabling a natural image on which the joints are difficult to see.

The large substrate 3 also serves as the reinforcing plate for the large-screen liquid crystal display 1 comprised of a plurality of liquid crystal panels 2 connected to each other, and makes the liquid crystal display 1 more resistant to physical shocks, thereby enabling a natural image on which the joints are difficult to see.

As has been explained, since the liquid crystal layer sealed in the liquid crystal panels 2 is substantially of the same thickness, using the TN (Twist Nematic) liquid crystal display mode does not affect a resulting display, and thus the display quality can be maintained.

In addition, since the liquid crystal display 1 does not use the polymer dispersed type liquid crystal display mode of the direct sight type, good contrast can be maintained. Also, because the liquid crystal display 1 demands a low driving voltage, it does not increase the power consumption.

As has been explained, the black matrix 5 made of the materials of the IV group or chromium oxide (CrOx) retains a greater photo-absorbing coefficient than the one made of the organic material. Thus, the surface reflection of the black matrix 5 can be reduced more efficiently, thereby enabling a natural image on which the joints are more difficult to see.

Also, as previously mentioned, the seal material 6 of the liquid crystal display 1 is either the ultraviolet-ray-setting resin or combination of thermosetting and ultraviolet-ray setting resin. Thus, there occurs no heat sagging and the seal material 6 can be placed around the pixel poles, thereby enabling a natural image on which the joints are more difficult to see.

Figure 3:
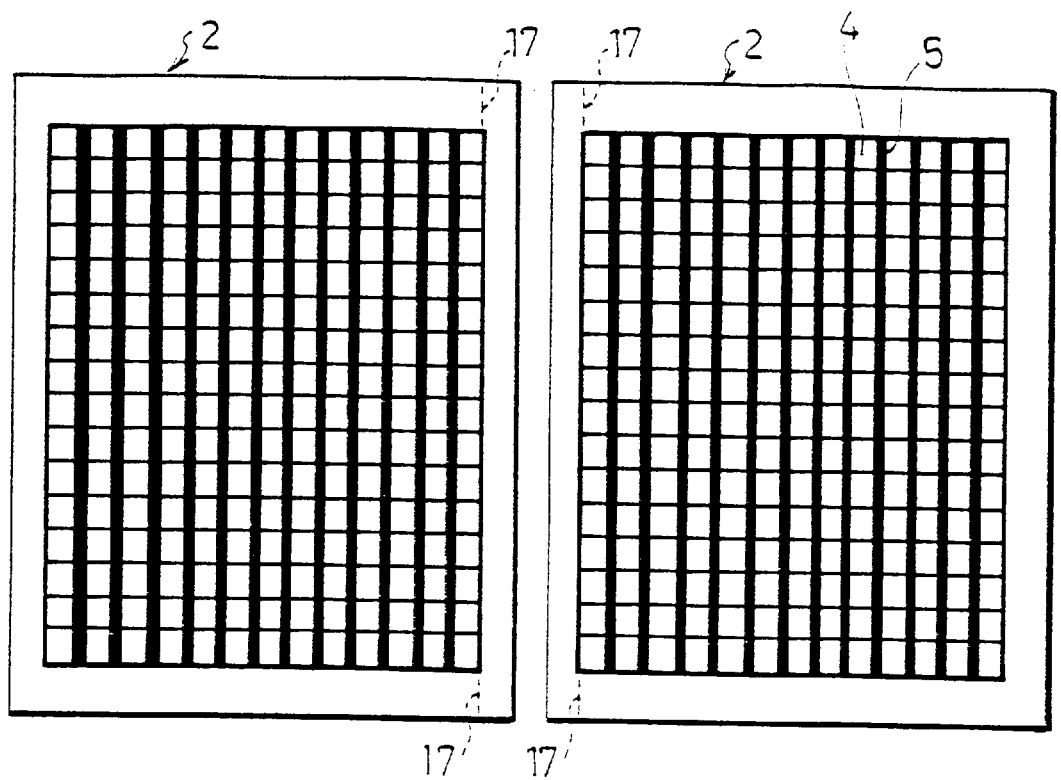
FIGS. 3(a) and 3(b) are plane views showing the arrangement of the liquid crystal panels on a single large-sized substrate.
Figure 3:
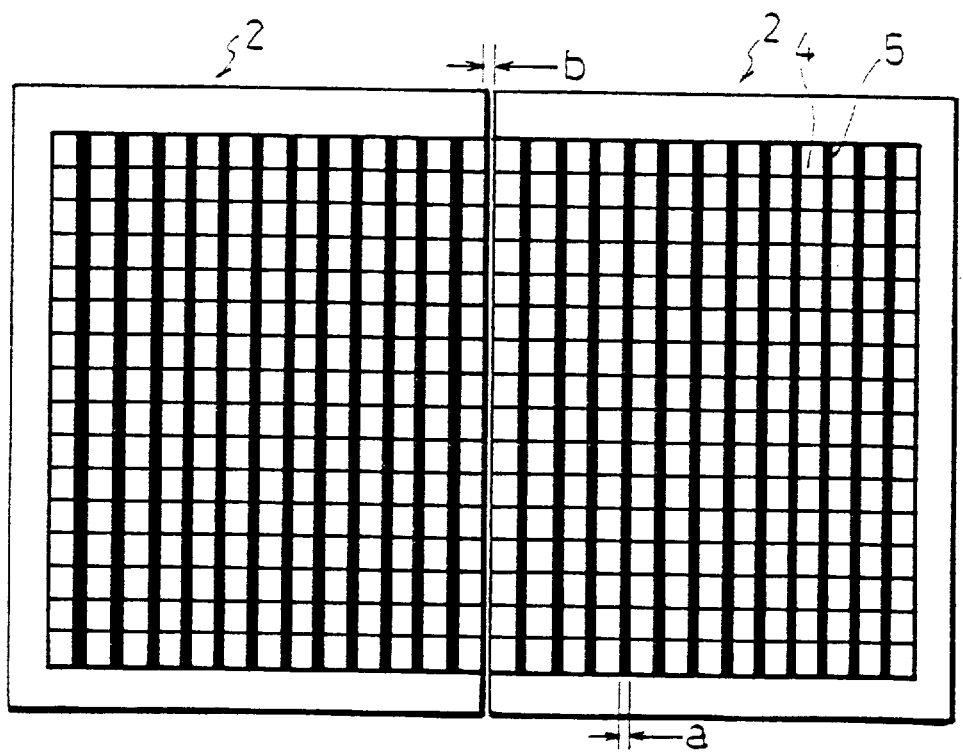

As has been explained while referring to FIG. 3, the width b of the space between the liquid crystal panels 2 is narrower than the trace width a of the black matrix 5. This makes the pixel pitch consistent across the entire liquid crystal display 1, thereby enabling a natural image on which the joints are more difficult to see.

As previously mentioned, the refraction factor adjusting material 9, whose refraction factor is substantially the same as that of the glass substrates 10 and 11 forming the liquid crystal panel 2, is filled in the connected parts of the liquid crystal panels 2. Consequently, the refraction and scattering of light caused by the irregularity on the end surface of the substrate at the connected parts of the liquid crystal panels 2 can be prevented, thereby enabling a natural image on which the joints are more difficult to see.

In addition, it is previously mentioned that the refraction factor adjusting material 9 may be also used as the adhesion agent to laminate the liquid crystal panels 2 to the large substrate 3. In this case, it is preferable to use the resin whose refraction factor is same as that of the glass substrate 11 and large substrate 3 because the reflection on the interface between the same degrades the contrast. Accordingly, a natural image on which the joints are more difficult to see can be obtained.

As has been explained, the liquid crystal panels 2 are of the active matrix type using the TFT's 16 herein. However, the liquid crystal panels of another active matrix type using a diode (MIM: Metal Insulator Metal) may be also used, and besides those of the active matrix type, the liquid crystal panel of a duty driving type may be used as well. Note that, however, the most preferable is the active matrix type because it has the least crosstalk and displays a high-quality image.

Second Embodiment

Another embodiment of the present invention will be explained while referring to FIGS. 1 through 5. Hereinafter, like components are labeled with like numerals with respect to the first embodiment and the description of these components is omitted for the explanation's convenience.

Figure 5:
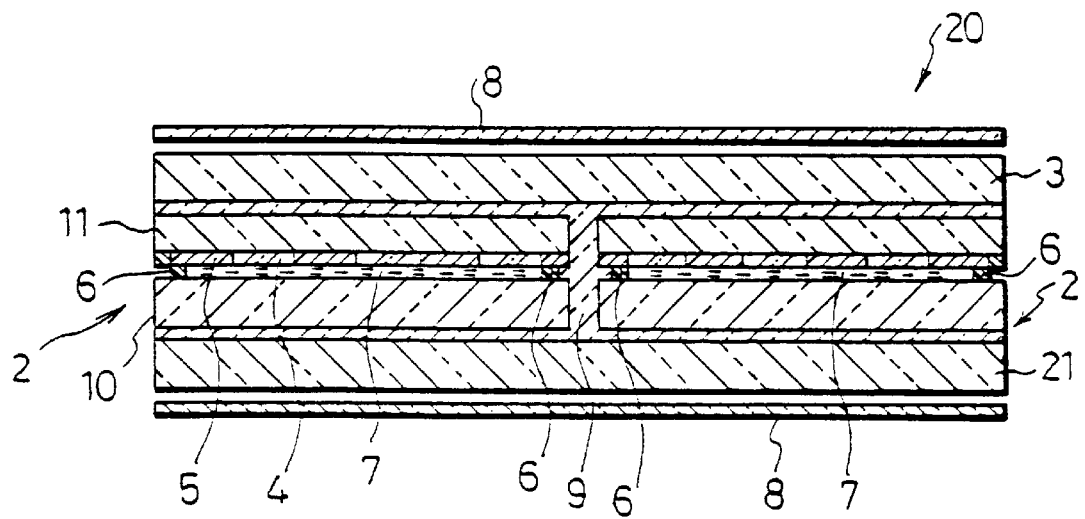
FIG. 5 is a cross sectional view showing the structure in accordance with another embodiment of the present invention.

As shown in FIG. 5, a liquid crystal display 20 of the second embodiment comprises a plurality of liquid crystal panels 2 sandwiched by two large substrate, the large substrate 3 (base) and a large substrate 21 (base). The liquid crystal panels 2 of the second embodiment are of the same structure as those of the first embodiment. The driver controlling the image signal and the back light are not shown in the drawing.

The liquid crystal display 20 differs from the liquid crystal display 1 of the first embodiment in that the large substrate 21 is additionally laminated to the liquid crystal panels 2 which have already laminated to the single plane of the large substrate 3. The refraction factor adjusting material 9, which is used to connect the liquid crystal panels 2, is also used to laminate the large substrate 21 to the liquid crystal panels 2.

In case of the liquid crystal display 1 of the first embodiment shown in FIG. 1, the resin, or refraction factor adjusting material 9, lies off the connected parts of the liquid crystal panels 2 and lies on the glass substrate 10 when the liquid crystal panels 2 are laminated to the single plane of the large substrate 3, thereby forming gaps or irregularities. Such gaps or irregularities are light scattering elements, and light passing through the same is scattered and changes the polarization condition, which makes it impossible for the spaces to show black under the crossed nicol state of the polarizing plates 8. Therefore, such a lie-off resin must be removed.

Accordingly, in case of the liquid crystal display 20 of the second embodiment, the large substrate 21 is provided at the rear surface of the liquid crystal display 20 (the side of the back light), or the side of the glass substrate 10, as shown in FIG. 5, which disallows the resin to lie off the connected parts of the liquid crystal panels 2. Thus, the light scattering elements, such as the gaps and irregularities, are formed neither on the resin-applied surface of the connected parts of the liquid crystal panels 2 nor the surfaces of the liquid crystal panels 2 on the side of the glass substrate 10.

As a result, the scattering of the light passing through the connected parts of the liquid crystal panels 2 is curbed to prevent the change of the polarization condition, and the light from the back light leaking through the spaces between the liquid crystal panels 2 remains to show black under the crossed nicol state of the polarizing plates 8, thereby enabling a more natural image easily on which the joints are more difficult to see compared with the liquid crystal display 1 of the first embodiment.

Since the connected liquid crystal panels 2 are sandwiched by a pair of the large substrates 3 and 21, the strength of the liquid crystal display 20 further increases. Thus, the liquid crystal display 20 can be handled easily even when it is used for a 20- or more inch screen.

Further, the large substrate 21 can hide the gaps on the rear surface (the side of the back light) of the liquid crystal display 20 caused by the difference in thickness or curvature of the glass substrates, or the scratches at the edge of the liquid crystal panels 2 caused by the pitching. Thus, since scattering of the light passing through the connected parts of the liquid crystal panels 2 can be further curbed and the prevention of change in the polarization condition can be further ensured, the light from the back light leaking through the spaces shows black better under the crossed nicol state of the polarizing plates 8, thereby enabling a more natural image on which the joints are more difficult to see.

Third Embodiment

Another embodiment of the present invention will be explained while referring to FIGS. 6 through 9. Hereinafter, like components are labeled with like numerals with respect to the above embodiments and the description of these components is omitted for the explanation's convenience.

Figure 6:
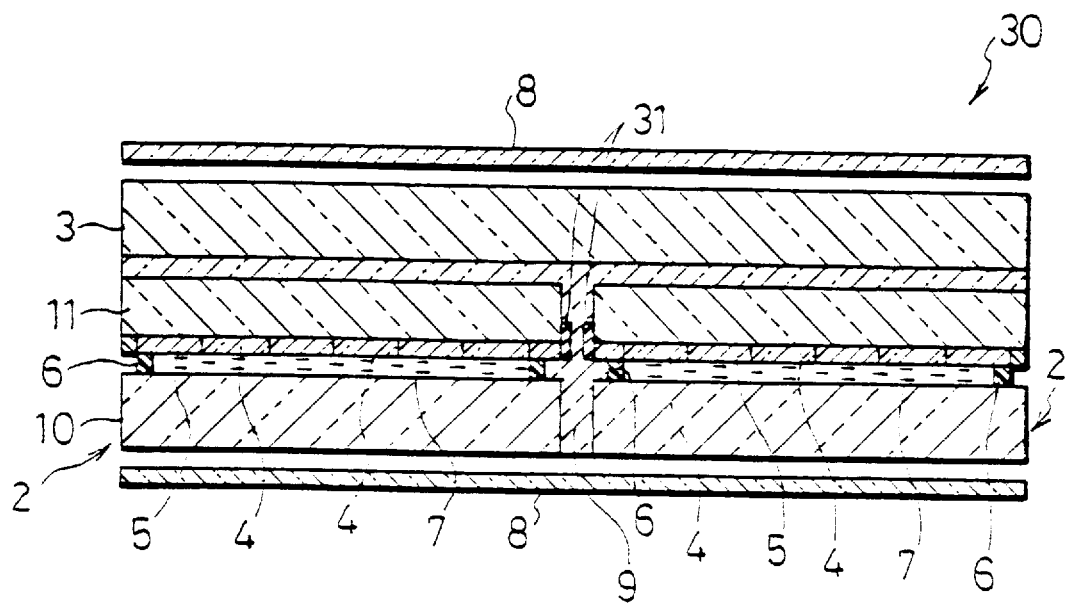
FIG. 6 is a cross sectional view showing the structure in accordance with another embodiment of the present invention.

As shown in FIG. 6, unlike the liquid crystal display 1 of the first embodiment, a liquid crystal display 30 of the third embodiment includes second photo-blocking films 31 that cover the end surfaces of the connected part side of the liquid crystal panels 2 (the end surface of the glass substrate 11) along a longitudinal direction in a predetermined width. Each second photo-blocking film 31 is perpendicular with respect to the black matrix 5 and extends in a constant width toward the front surfaces of the liquid crystal panels 2. The second photo-blocking films 31 are made of, for example, a black resin made by dispersing a pigment or semi-conducting particulates (for example, carbon particulates or titanium oxide particulates, respectively) in a resin.

As has been explained, the liquid crystal display 1 of the first embodiment and liquid crystal display 20 of the second embodiment are characterized in that the light from back light leaking through the connected parts of the liquid crystal panels 2 shows black under the crossed nicol state of the polarizing plates 8 to make the selves undistinguishable from the black matrix 5, thereby making the joints between the liquid crystal panels 2 difficult to see.

The liquid crystal display 30 retains the same characteristics as above. To be more specific, as shown in FIG. 7, for the viewer A standing substantially in front of the liquid crystal display 30, the joints of the connected parts of the liquid crystal panels 2 show black (indicated by a circle in the drawing) entirely under the crossed nicol state of the polarizing plates 8, thereby making the joints between the liquid crystal panels 2 difficult to see.

Figure 9:
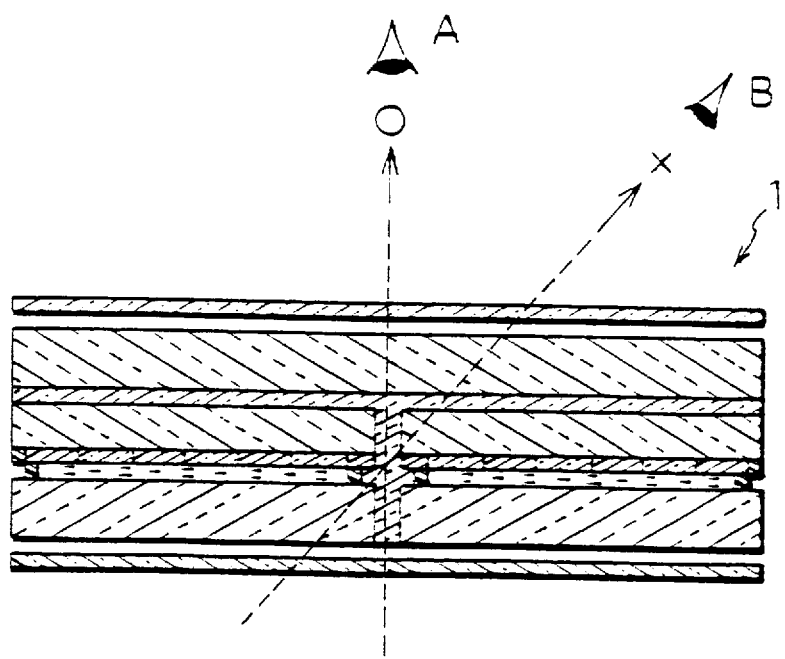
FIG. 9 is a cross sectional view showing the viewing angle characteristics of a comparative-use liquid crystal display.

However, the polarizing plates 8 generally retains viewing angle characteristics. That is to say, the incident light diagonally with respect to the polarizing plates 8 can not show black completely even under the crossed nicol state. As shown in FIG. 9, in case of the liquid crystal display 1 of the first embodiment, for the viewer A standing substantially in front of the same, the connected parts of the liquid crystal panels 2 show black (indicated by a circle in the drawing) entirely under the crossed nicol state of the polarizing plates 8, thereby making the joints between the liquid crystal panels 2 difficult to see. However, for a viewer B standing diagonally with respect to the liquid crystal display 1, the light from the back light (indicated by an X in the drawing) leaks through the connected parts of the liquid crystal panels 2 due to the viewing angle characteristics of the polarizing plates 8, thereby making the joints rather easy to see.

Figure 7:
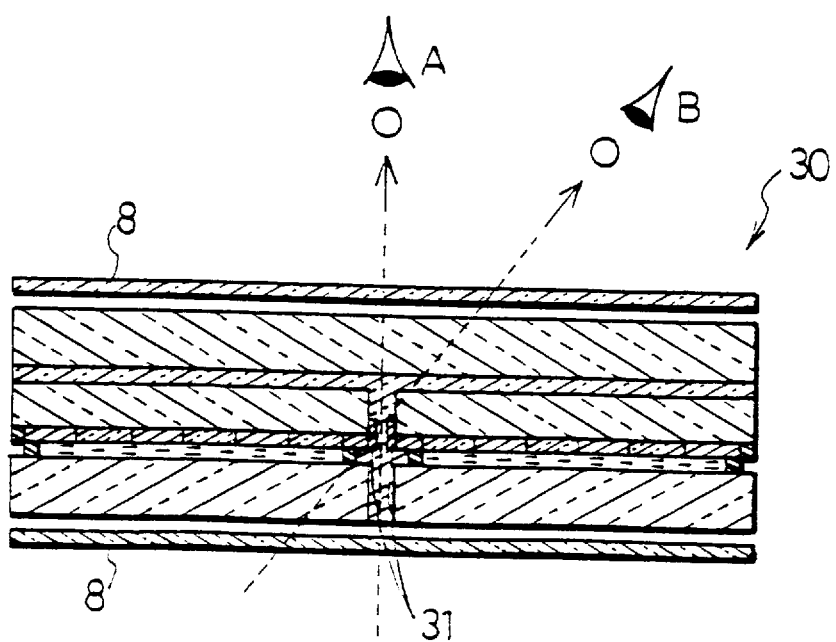
FIG. 7 is a cross sectional view showing the viewing angle characteristics of the above liquid crystal display.

In contrast, in case of the liquid crystal display 30 of the third embodiment, for the viewer B standing diagonally with respect to the same, the light leaking through the connected parts of the liquid crystal panels 2 are blocked by the second photo-blocking films 31 as shown in FIG. 7. As a result, the viewer B sees black entirely (indicated by a circle in the drawing) as does the viewer A, thereby making the joints between the liquid crystal panels 2 difficult to see. In other words, the liquid crystal display 30 of the third embodiment can make the joints between the liquid crystal panels 2 difficult to see independently of the viewing angle of the viewer in a broad range.

As shown in FIG. 8($a$), let the trace width of the black matrix 5 (first photo-blocking film) at the edge of the glass substrate 11 be c, and the width of the second photo-blocking film 31 be d. Then, an optimal relationship between the trace width c and width d in terms of location will be explained in the following.

First, the necessary condition for the width d of the second photo-blocking film 31 will be explained.

As shown in FIG. 8($a$), when the black matrix 5 is provided on the glass substrate 11 side, the width d of the second photo-blocking film 31 is a distance d extending in the direction of the surface of the glass substrate 11 along the end surface thereof from the end of the connected part side of the glass substrate 11, whereas when the black matrix 5 is provided on the glass substrate 10, the width d of the second photo-blocking film 31 is a distance d extending in the direction of the surface of the glass substrate 10 along the end surface thereof from the end of the connected part side of the glass substrate 10.

When the width d is wide more than necessary, the second photo-blocking film 31 may block image displaying light passing through the color filter 4, which undesirably narrows the viewing angle of the liquid crystal display 30 in the end. Thus, the width d of the second photo-blocking film 31 must be determined in a range that does not limit the viewing angle of the liquid crystal display 30.

Next, how the image displaying light (incident light from the back light) passes through the liquid crystal display 30 will be explained while referring to FIGS. 8($a$) and 8($b$). Note that the liquid crystal display 30 is shown schematically in FIG. 8($b$) for the explanation's convenience.

As shown in FIG. 8($a$), the image displaying light irradiated from the rear side of the liquid crystal display 30 enters into the glass substrate 10 at an incident angle $\theta 1$, reflects at an angle $\theta 2$ within the glass substrate 10 to pass through the color filter 4 and glass substrate 11 at the same angle, and goes out from the glass substrate 11 after it has deflected at the angle $\theta 1$. In other words, as shown in FIG. 8($b$), the image displaying light entering into the liquid crystal display 30 at the incident angle $\theta 1$ from the rear side thereof passes through the same at the angle $\theta 2$, and goes out from the same at the angle $\theta 1$. Note that the refracting factors of the liquid crystal 7 and color filter 4 are negligible herein because the liquid crystal 7 and color filter 4 of some microns in thickness are significantly thin compared with the glass substrates 10•11 of some millimeters in thickness.

The angles $\theta 1$ and $\theta 2$ satisfy Equation (1) below in accordance with Snell's law, $$\sin \theta 1 = n \sin \theta 2 \qquad (1)$$

where n is the refracting factor of the glass substrates 10 and 11 forming the liquid crystal display 30 and the refracting factor of air is one. Since n is greater than one (n>1) generally, a critical angle $\theta 2'$ of the angle $\theta 2$ can be found by substituting $\theta 1 = 90°$ into Equation (1).

Than is to say, the critical angle θ2' satisfies Equation (2) below, $$1 = n \sin \theta 2' \quad (2)$$

Figure 8A:
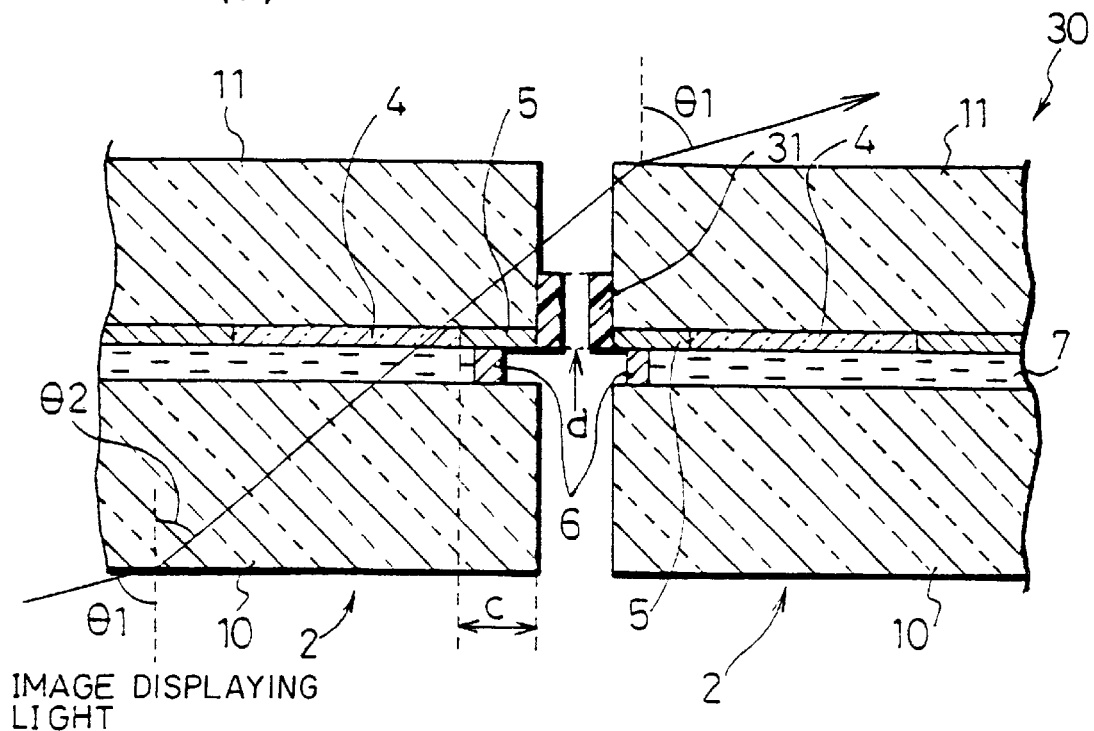
FIGS. 8(a) and 8(b) are views showing the connected parts of the liquid crystal panels in the above liquid crystal display.
Figure 8B:
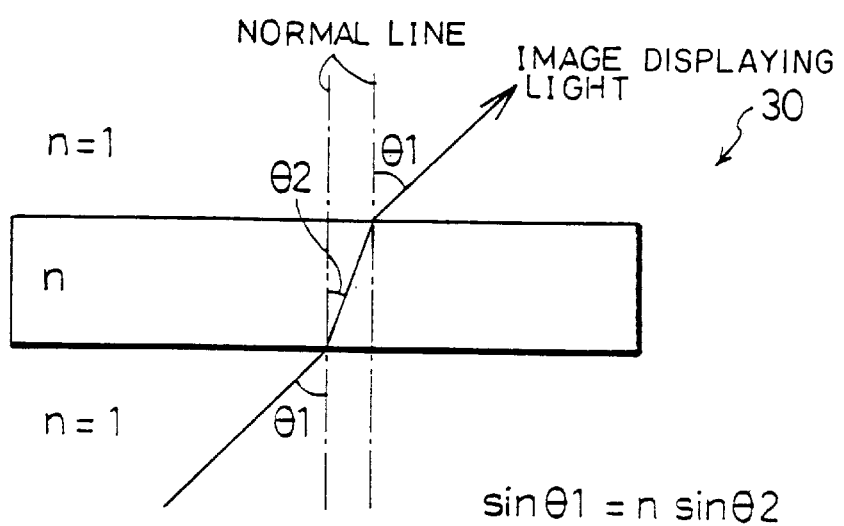

The critical angle θ2' of the angle θ2 means that the image displaying light (incident light from the back light) entering into the liquid crystal display 30 at any angle passes through the same at an angle equal to or less than the critical angle θ2'. Thus, the width d of the second photo-blocking film 31 can be found by taking the critical angle θ2' into account. To be more specific, not to block the light that must pass through the liquid crystal display 30, that is to say, the image displaying light passing through the color filter 4 to the connected parts of the liquid crystal panels 2, by the second photo-blocking film 31 as shown in FIG. 8(a), the width d must satisfy Equation (3) below, $$\tan \theta 2' \leq (c/|d|) \quad (3)$$

In other words, the width d can be found by Equation (4) below, which is converted from Equation (3) using Equation (2), $$|d| \leq c/\tan(\sin^{-1}(1/n)) \quad (4)$$

Thus, determining the width d of the second photo-blocking film 31 to satisfy Equation (4) enables the image displaying light to pass through the color filter 4 without being blocked by the second photo-blocking film 31, thereby ensuring a sufficient viewing angle of the liquid crystal display 30.

In addition, the second photo-blocking film 31 blocks unwanted outgoing light from the pixel electrode side (color filter 4 side) of the liquid crystal panels 2 to the connected parts of the liquid crystal panel 2. Thus, when the viewer sees the display image diagonally, that is to say, he sees the same through the connected parts of the liquid crystal panels 2 from the external thereof, the second photo-blocking film 31 can curb the light leakage caused by the viewing angle characteristics of the polarizing plates 8 explained in the first embodiment.

Accordingly, the light leakage through the connected parts of the liquid crystal panels 2 can be eliminated in all the directions without depending on the viewing angle of the viewer while a portion where light leaks through the connected parts of the liquid crystal panels 2 shows black under the crossed nicol state. This enables a natural image on which the joints are more difficult to see.

In this embodiment, the second photo-blocking film 31 is provided at the end of the glass substrate 11 in the width d as shown in FIG. 8(a). However, the second photo-blocking film 31 may be provided at the end of the glass substrate 10 as long as the width d thereof satisfies Equation (4), or it may be provided in such a manner that it spreads across the ends of the glass substrates 10•11.

Since the glass substrates 10•11 forming the liquid crystal device 30 of this embodiment are glass substrates (Corning 7059) having a refracting factor n of 1.53 (n=1.53), the critical angle θ2'=40.8° is found from Equation (2). Also, $|d| \leq 174$ μm can be found from Equation (4), given 150 μm as the trace width c of the black matrix 5 at the end of the glass substrate 11 (c=150 μm).

This means that the second photo-blocking film 31 must be formed in the width $|d| \leq 174$ μm to extend from the end of the connected part side of the glass substrate 11 in the longitudinal direction of the end surface of the connected part side of the glass substrate 11.

Note that the location and size of the second photo-blocking film 31 are not limited to those shown in FIGS. 6 through 8(b), and it can be provided at any location and any size as long as it blocks light leaking through the connected parts of the liquid crystal panels 2 for the viewer standing diagonally with respect to the liquid crystal display 30.

Fourth Embodiment

Another embodiment of the present invention will be explained while referring to FIGS. 10 and 11. Hereinafter, like components are labeled with like numerals with respect to the above embodiments and the description of these components is omitted for the explanation's convenience.

As has been explained, in case of the liquid crystal displays of the first through third embodiments, the black matrix 5 is a black film made of the organic or non-organic material, and the joints between the liquid crystal panels 2 are made difficult to see by curbing the reflection from the black matrix 5.

The black matrix 5 made of either the organic or non-organic material is inferior to the one made of the metal film in terms of photo-blocking properties. For this reason, the black matrix 5 must be 1 μm or more in thickness, which may affect the evenness of cell gap of the liquid crystal panels 2.

Figure 10:
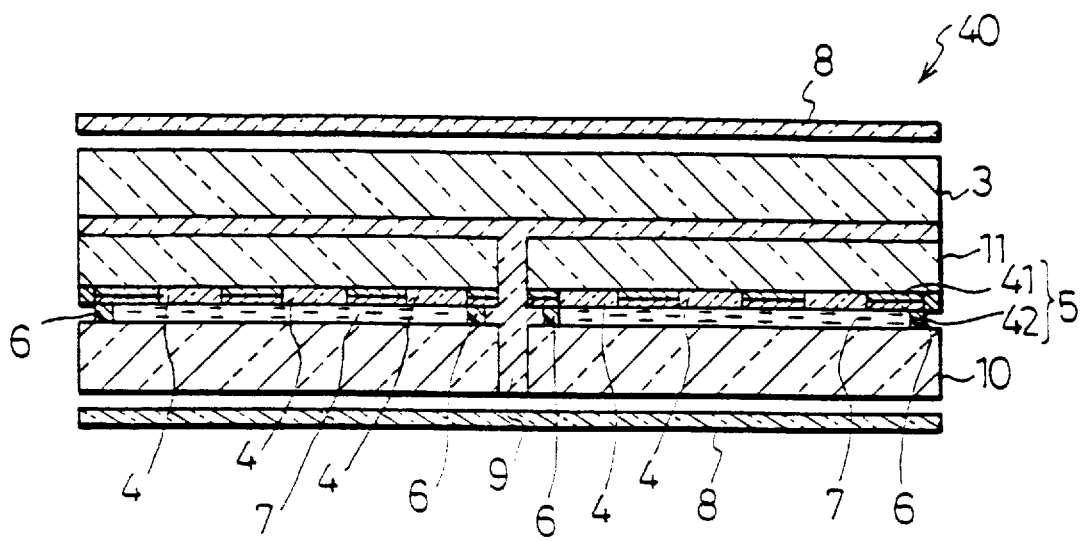
FIG. 10 is a view showing the structure of a liquid crystal display in accordance with another embodiment of the present invention.

In contrast, in case of a liquid crystal display 40 of the fourth embodiment, the black matrix 5 (first photo-blocking film) is a layered film made of a photo-absorbing film 41 and a metal film 42 as shown in FIG. 10. The metal film 42 is made of, for example, chromium (Cr) or aluminium (Al).

The metal film 42, which exhibits excellent photo-blocking properties, can make the black matrix 5 approximately 0.5 μm in thickness while upgrading the photo-blocking properties of the black matrix 5, thereby making the cell gap more consistent across the entire liquid crystal panels 2.

Figure 11:
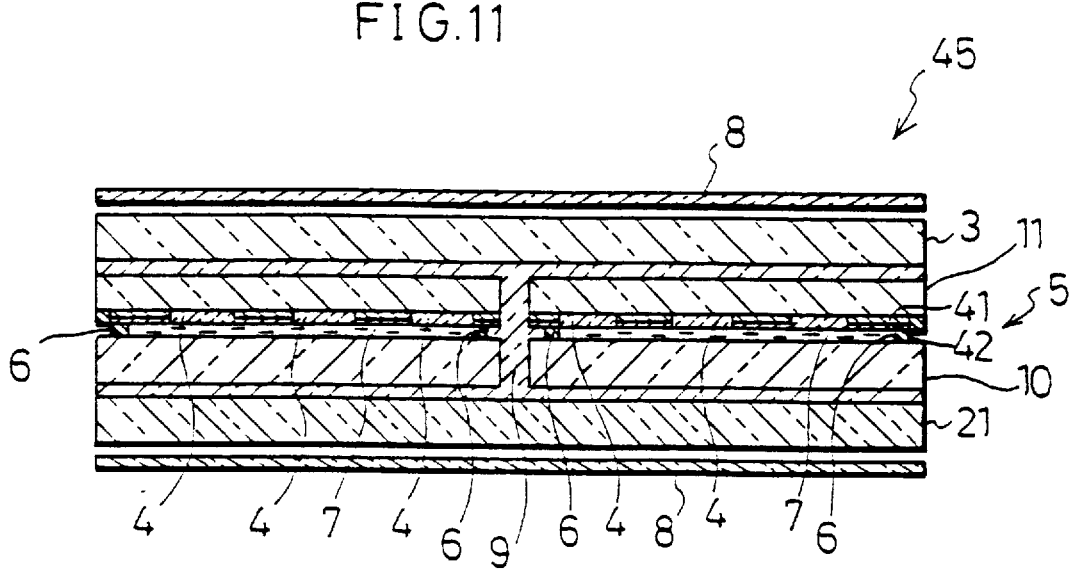
FIG. 11 is a cross sectional view showing another structure of the above embodiment.

Also, as shown in FIG. 11, the liquid crystal display 40 may additionally include the large substrate 21 besides the large substrate 3 like the liquid crystal display 20 of the second embodiment to form a liquid crystal display 45, so that the cell gap becomes more consistent across the entire liquid crystal panels 2 as is with the liquid crystal display 40.

The black matrix 5 made of the photo-absorbing film 41 and metal film 42 is provided on the glass substrate 11; however, it may be provided on the other glass substrate 10. Alternately, instead of providing the black matrix 5 to the either substrate, the metal film 42 may be provided on the glass substrate 10 and the photo-absorbing film 41 may be provided on the other glass substrate 11.

Fifth Embodiment

Another embodiment of the present invention will be explained while referring to FIG. 12. Hereinafter, like components are labeled with like numerals with respect to the above embodiments and the description of these components is omitted for the explanation's convenience.

In the first through fourth embodiments, one or two substrates (large substrates 3 or 21) are used as the reinforcing plate when connecting a plurality of liquid crystal panels 2. However, the reinforcing plate is not an essential component and a liquid crystal display can comprise without the same.

Figure 12:
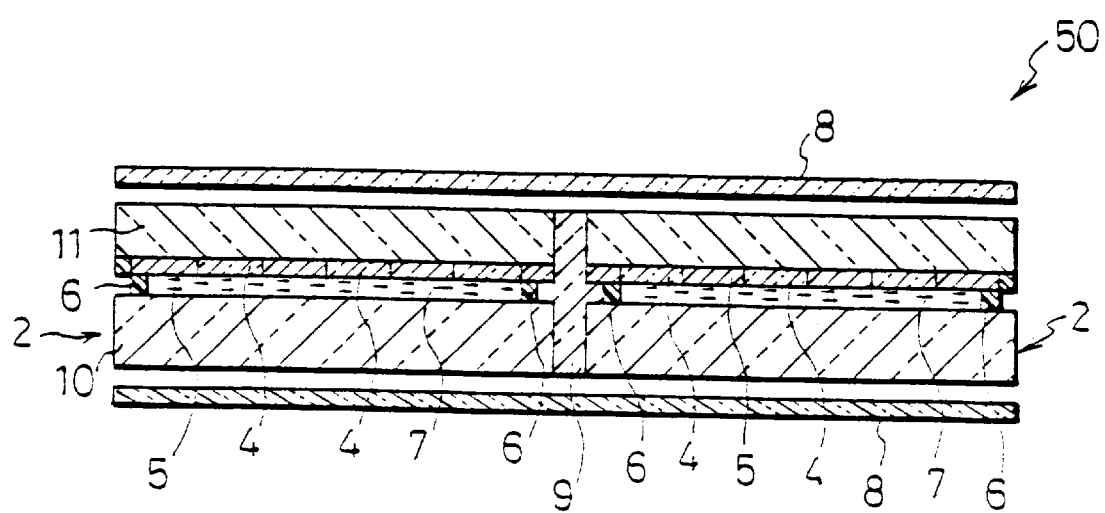
FIG. 12 is a view showing the structure of a liquid crystal display in accordance with another embodiment of the present invention.

To be more specific, in case of a liquid crystal display 50 of the fifth embodiment, the liquid crystals panels 2 are connected without using the reinforcing plate as shown in FIG. 12. In this case, the polarizing plates 8, each of which is an acrylic plate of 1–2 mm in thickness, also serve as the reinforcing plates, thereby maintaining the strength of the liquid crystal display 50. As a result, a natural image on which the joints between the liquid crystal panels 2 are difficult to see can be obtained.

Sixth Embodiment

Another embodiment of the present invention will be explained while referring to FIGS. 13 and 14. Hereinafter, like components are labeled with like numerals with respect to the above embodiments and the description of these components is omitted for the explanation's convenience.

In the first through fifth embodiments, each liquid crystal display comprises a plurality of liquid crystal panels 2 connected to each other, and two polarizing plates 8 are respectively provided at the front and rear surface thereof almost entirely in such a manner that their respective polarizing axes intersect at right angles. Thus, a portion where light leaks through the connected parts of the liquid crystal panels 2 shows black under the crossed nicol state of the polarizing plates 8, thereby making the joints between the liquid crystal panels 2 difficult to see.

Also, filling the refraction factor adjusting member 9 into the spaces of the connected parts of the liquid crystal panels 2 makes the joints between the liquid crystal panels 2 more difficult to see.

However, with the liquid crystal display in each of the above embodiments, transmitting light from the back light, which is determined by the polarizing plates 8, may be modulated by the refraction factor adjusting member 9 if the refraction factor adjusting member 9 has an aeolotropic refraction property (multi-refraction property), thereby causing partial light leakage through or coloring in the connected parts of the liquid crystal panels 2 even under the crossed nicol state of the polarizing plates 8.

Figure 13:
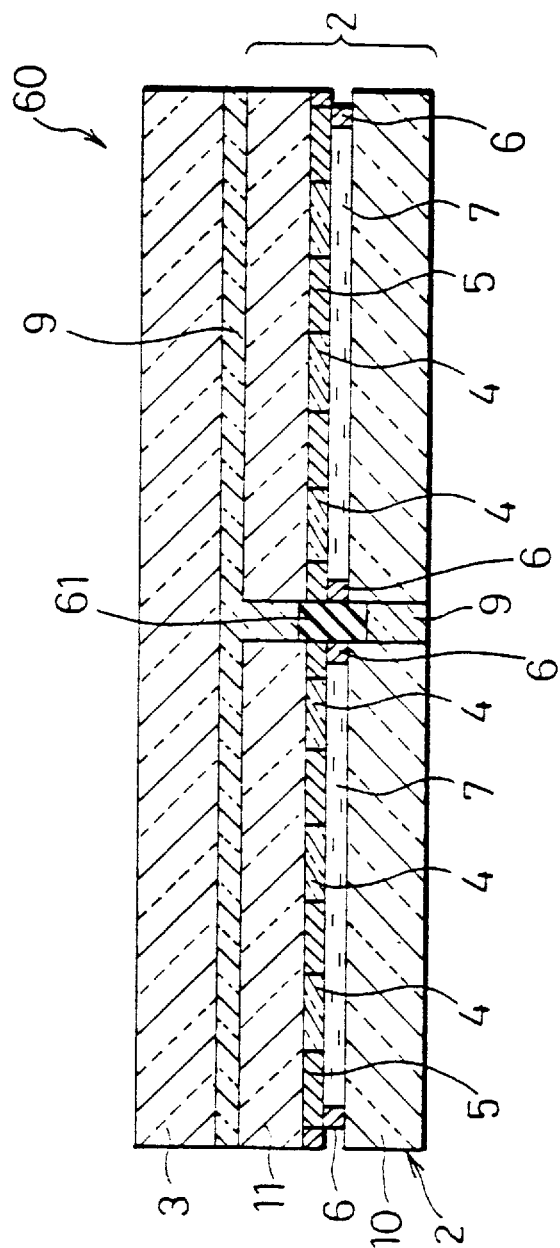
FIG. 13 is a cross sectional view showing the structure of a liquid crystal display in accordance with another embodiment of the present invention.
Figure 14:
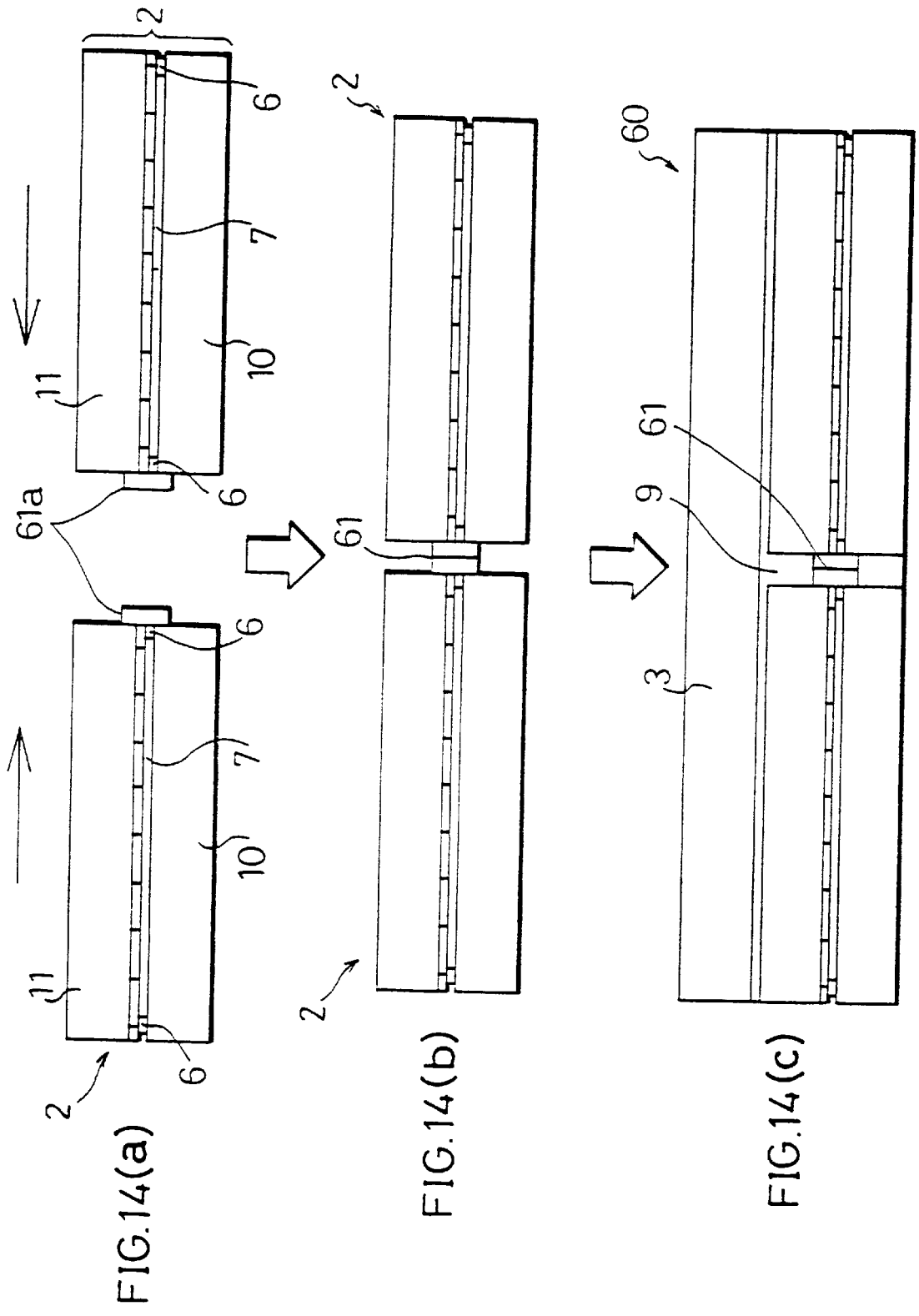
FIG. 14 is view explaining the manufacturing process of the liquid crystal display of FIG. 13.
Figure 15:
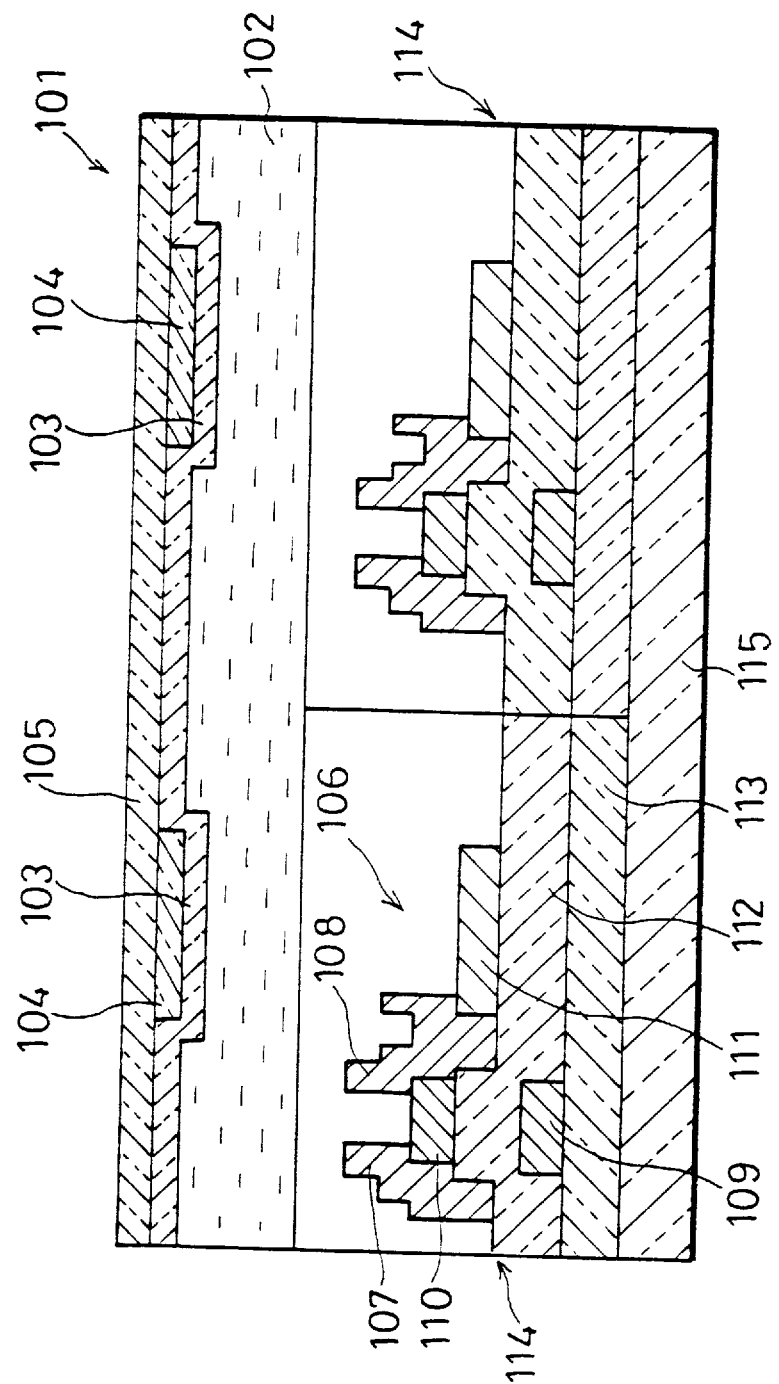
FIG. 15 is a cross sectional view showing the structure of a conventional liquid crystal display.
Figure 16:
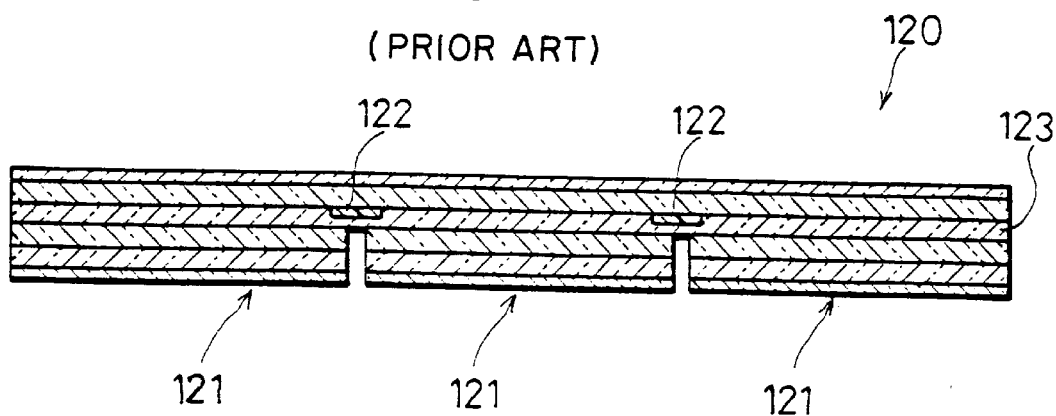
FIG. 16 is a cross sectional view showing the structure of another conventional liquid crystal display.
Figure 17:
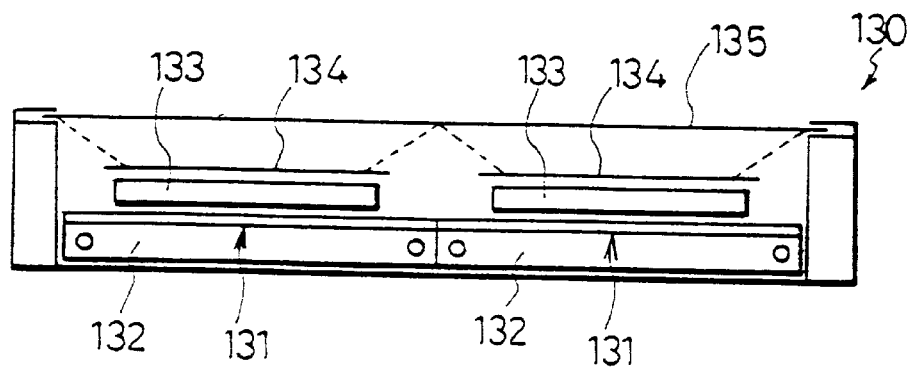
FIG. 17 is a cross sectional view showing the structure of another conventional liquid crystal display.
Figure 18:
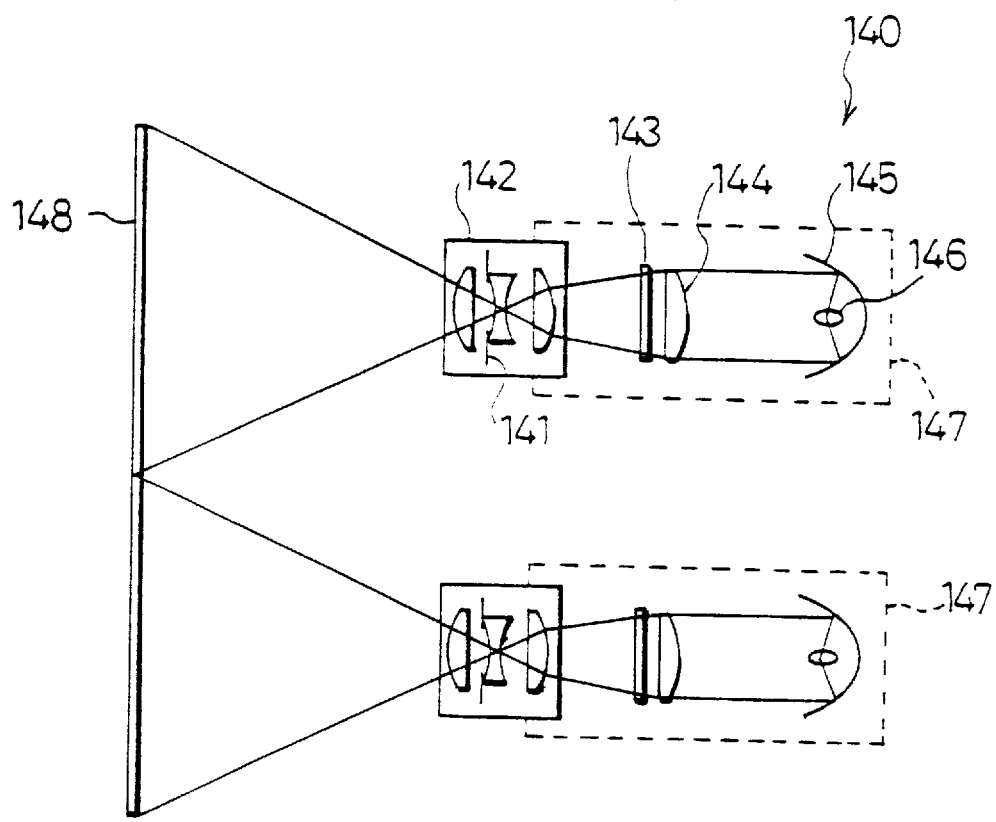
FIG. 18 is a cross sectional view showing the structure of another conventional liquid crystal display.

In contrast, as shown in FIG. 13, a liquid crystal display 60 in accordance with the six embodiment includes a third photo-blocking film 61 which fills the spaces of the connected part of the liquid crystal panels 2 in the longitudinal direction. According to this structure, light passing through the connected parts of the liquid crystal panels 2 can be blocked, and thus the light leakage through the connected parts can be eliminated completely, thereby enabling a natural image on which the joints are more difficult to see.

The third photo-blocking film 61 is provided around the center of the end surface of the connected part side of each liquid crystal panel 2 in such a manner that it covers the end surface of the connected part side of each liquid crystal panel 2 in a width narrower than the width thereof. This is done so not to inhibit the display of the pixel adjacent to the third photo-blocking film 61, or not to block the light (image displaying light) passing through the color filter 4 when the viewer sees the liquid crystal display 60 diagonally so as not to limit the viewing angle of the liquid crystal display 60.

For the above reason, the width of the third photo-blocking film 61 must be determined in a range that does not limit the viewing angle of the liquid crystal display 60. That is to say, the third photo-blocking film must be formed in the same manner as the second photo-blocking film 31 in the third embodiment.

When the third photo-blocking film 61 which fills the spaces of the connected parts of the liquid crystal panels 2 in the longitudinal direction as has been explained, the connected parts of the liquid crystal panels 2 can be made difficult to see should the connected parts of the liquid crystal panels 2 and the refraction factor adjusting member 9 filled in the vicinity thereof have the aeolotropic refraction (multi-refraction) property. In short, with the liquid crystal display 60 structured as above hides the joints between the liquid crystal panels 2 by blocking the light leaking through the connected parts of the liquid crystal panels 2 using the third photo-blocking film 61.

The method of manufacturing the liquid crystal display 60 will be explained in the following while referring to FIGS. 14(a) through 14(c).

To begin with, as shown in FIG. 14(a), a blocking member 61a is formed in a predetermined width in the longitudinal direction and around the center of the side surface of connected part side of each liquid crystal panels 2 to be connected each other.

Then, as shown in FIG. 14(b), the liquid crystal panels 2 are connected to each other so that the blocking members 61a have a close contact. Here, the third photo-blocking film 61 is the photo-blocking members 61a connected each other.

Subsequently, as shown in FIG. 14(c), the large substrate 3 is laminated to the liquid crystal panels 2 by means of the refraction factor adjusting member 9 while keeping the liquid crystal panels 2 connected to each other through the third photo-blocking film 61. The liquid crystal display 60 is formed in this way.

Note that the photo-blocking members 61a are formed on the side surface of the connected part side of each liquid crystal panels 2 to be connected in the above method; however, it may be formed on the side surface of the connected part side of one of the liquid crystal panels 2 to be connected each other.

It is generally difficult to completely fill the space on the connected parts of the liquid crystal panels caused by the irregularity, undulation, stress, etc. on the side surface of the connected part side of the liquid crystal panels by the photo-blocking film, and thus partial light leakage may occur. To prevent this problem, the third photo-blocking film 61 is made of an elastic photo-absorbing material. This is because, when the third photo-blocking film 61 is made of the elastic photo-absorbing material, the elasticity thereof absorbs the irregularity, undulation, stress, etc. on the side surface of the connected part side of the liquid crystal panels. Accordingly, the spaces on the connected parts of the liquid crystal panels 2 can be filled easily at a predetermined point completely. It is preferable to make the third photo-blocking film 61 out of a photo-absorbing material whose elastic coefficient (Young's coefficient) of $10^4$–$10^8$ N/m$^2$.

Note that it is most preferable to make the third photo-blocking film 61 out of a photo-absorbing material whose principal ingredient is silicon-based rubber (silicon resin). The reasons are as follow:

1) the silicon-based rubber is a polymer having a set of siloxane bonds (—Si—O—)n as the main chain, and alkyl and arlyl, or the derivatives thereof as the side chain group, that is to say, it has a semi-non-organic and semic-organic molecule structure;

2) the silicon-based rubber is in the form of fluid or paste when applied and turned into rubber by being set by the exposure to air, room temperature or slight heating, or irradiation of an ultra-violet ray, thereby making it possible to apply the third photo-blocking film 61 in an accurate width and height besides being easy to handle; and 3) the post-set silicon-based rubber remains stable in a broad range of temperatures, and renders excellent chemical and aging resistance, thereby enables the third photo-blocking film 61 to render stable photo-blocking characteristics when it is let to stand to have a contact to the refraction factor adjusting member 9.

Note that, besides the silicon-based rubber, butadiene-based rubber, butyl rubber, chloroprene-based rubber, natural rubber, and other chain polymer materials may be used as the elastic photo-absorbing member.

It is effective to mix the elastic material with a black pigment, dye, pigment matter, etc. to enhance the photo-blocking ability of the third photo-blocking film 61. For example, an elastic third photo-blocking film 61 having an excellent photo-blocking ability can be formed by mixing the silicon-based rubber with an adequate amount of carbon black pigment.

Also, the third photo-blocking film 61 may be formed by:

1) applying the silicon-based rubber while covering a predetermined portion on the side surface of the connected part side of the liquid crystal panel 2 with a mask tape;

2) applying the silicon-based rubber using a dispenser;

3) applying the silicon-based rubber by the screen process printing or offset printing.

In addition, the liquid crystal display 60 of this embodiment is not limited to the structure explained as above as long as it includes the third photo-blocking film 61, and may be any of the structures of the first through fifth embodiment, thereby further obtaining the functions realized by each embodiment.

Unlike the liquid crystal displays of the first through fifth embodiments which prevent the light leakage through the connected parts of the liquid crystal panels 2 by exploiting the crossed nicol state of the polarizing plates 8, the liquid crystal display 60 of this embodiment does the same using the third photo-blocking film 61 formed in the connected parts of the liquid crystal panels 2.

Thus, the liquid crystal display 60 can be applied to a liquid crystal display mode that does not demand the polarizing plates 8, such as the one employing a polymer dispersed liquid crystal (PDLC) and a guest host (GH) type liquid crystal using dichroism.

The liquid crystal display 60 can be further applied to a display panel that does not demand a polarizing element except for the liquid crystal display, such as a multi-screen display made by connecting a set of plasma display panels (PDP's), or electroluminescent display panels (ELD's).

As has been explained, the first liquid crystal display of the present invention is characterized in that the liquid crystal display main body comprised of a plurality of liquid crystal panels placed on a single plane so as to be connected to each other adjacently is covered almost entirely with the polarizing elements respectively on the front and rear surfaces thereof in such a manner that their respective polarizing axes intersect at right angles.

According to the above structure, since two polarizing elements are respectively provided almost entirely on the front and rear surfaces of the liquid crystal display comprised of a plurality of liquid crystal panels connected to each other adjacently and the polarizing elements are provided in such a manner that their respective polarizing axes intersect at right angles, a portion where light leaks through the connected parts of the liquid crystal panels shows block under the crossed nicol state of the polarizing elements, thereby making the joints between the liquid crystal panels difficult to see.

As has been explained, the second liquid crystal display of the present invention, which is of the structure of the first liquid crystal display, is characterized in that it further includes the first matrix photo-blocking film which covers the circumference of the pixel electrode of each liquid crystal panel in a predetermined trace width.

According to the above structure, in addition to the function realized by the first liquid crystal display, light unwanted in the area other than the pixel electrodes can be blocked by providing the first matrix photo-blocking film which covers the circumference of the pixel electrode of each liquid crystal panel in a predetermined trace width. Accordingly, the light leakage through the connected parts of the liquid crystal panels can be reduced, and thus the joints between the liquid crystal panels are made more difficult to see.

As has been explained, the third liquid crystal display of the present invention is characterized in that:

the liquid crystal display main body comprised of a plurality of liquid crystal panels placed on a single plane so as to be connected to each other adjacently is covered almost entirely with the polarizing elements respectively on the front and rear surfaces thereof in such a manner that their respective polarizing axes intersect at right angles; and it further includes the first matrix photo-blocking film which covers the circumference of the pixel electrode of each liquid crystal panel in a predetermined trace width and the second photo-blocking film which covers the end surface of the connected part side of each liquid crystal panel in the longitudinal direction in a predetermined width.

According to this structure, since two polarizing elements are respectively provided almost entirely on the front and rear surfaces of the liquid crystal display comprised of a plurality of liquid crystal panels connected to each other adjacently and the polarizing elements are provided in such a manner that their respective polarizing axes intersect at right angles, a portion where light leaks through the connected parts of the liquid crystal panels shows block under the crossed nicol state of the polarizing elements, thereby making the joints between the liquid crystal panel difficult to see.

In addition, light unwanted in the area other than the pixel electrodes can be blocked by providing the first matrix photo-blocking film which covers the circumference of the pixel electrode of each liquid crystal panel in a predetermined trace width. Further, unwanted light from the side of the pixel electrodes of the liquid crystal panels to the connected parts of the liquid crystal panels can be blocked by providing the second matrix photo-blocking film which covers the end surface of the connected part side of each liquid crystal panel in the longitudinal direction in a predetermined width. Accordingly, the second photo-blocking film can curb the light leakage caused by the viewing angle characteristics of the polarizing elements even when the viewer sees the display image diagonally, that is to say, he sees the same through the connected parts of the liquid crystal panels from the external thereof.

Thus, not only a portion where light leaks through the connected parts of the liquid crystal panels shows block under the crossed nicol state of the polarizing elements, but also the light leakage through the area other than the pixel electrodes of the liquid crystal panels and from the connected parts of the liquid crystal panels can be eliminated in all the directions independently of the viewing angle of the viewer, thereby enabling a natural image on which the joints are more difficult to see.

As has been explained, the fourth liquid crystal display of the present invention is characterized in that:

the liquid crystal display main body comprised of a plurality of liquid crystal panels placed on a single plane so as to be connected to each other adjacently includes:

the first matrix photo-blocking film that covers the circumference of the pixel electrode of each liquid crystal panel in a predetermined trace width; and the third photo-blocking that fills the spaces of the connected parts of the liquid crystal panels is provided in the connected parts.

According to the above structure, light unwanted in the area other than the pixel electrodes can be blocked by providing the first matrix photo-blocking film which covers the circumference of the pixel electrode of each liquid crystal panel in a predetermined trace width.

Further, the light passing through the spaces of the connected parts of the liquid crystal panels can be blocked completely by providing the third photo-blocking film that fills the spaces of the connected parts of the liquid crystal panels, thereby eliminating the light leakage through the connected parts of the liquid crystal panels completely.

As a result, the light leakage not only through the area other than the pixel electrodes of the liquid crystal panels, but also through the connected parts of the liquid crystal panels can be eliminated, thereby enabling a natural image on which the joints are more difficult to see.

As has been explained, the fifth liquid crystal display, which is of the structure of the third or fourth liquid crystal display, is characterized in that the width d of the second or third photo-blocking film satisfies $|d| \leq c/\tan(\sin^{-1}(1/n))$, where d is the width of the second or third photo-blocking film from the end point where the first photo-blocking film is formed on the side surface of the connected part side of the liquid crystal panel, c is the trace width of first photo-blocking film at the end of the connected part side of the liquid crystal panel to the main surface of the liquid crystal panel, and n is the refraction factor of the substrates forming the liquid crystal panel.

According to the above structure, in addition to the function realized by the third or fourth liquid crystal display, the second or third photo-blocking film can block unwanted light from the pixel electrode side of the liquid crystal panel to the connected parts of the liquid crystal panels, while at the same time, all of the light that must pass through the pixel electrode from the rear surface of the liquid crystal panel to the connected parts of the liquid crystal panels can do so without being blocked by the second or third photo-blocking film, because the width d of the second or third photo-blocking film satisfies $|d| \leq c/\tan(\sin^{-1}(1/n))$. Accordingly, not only the light leakage through the area other than the pixel electrodes of the liquid crystal panels and the connected parts of the liquid crystal panels can be eliminated completely, but also the viewing angle of the liquid crystal display can be secured, which enables a natural image on which the joints are more difficult to see.

As has been explained, the sixth liquid crystal display, which is of the structure of the first, third, or fourth liquid crystal display, is characterized in that the refraction factor adjusting material having substantially the same refraction factor as the refraction factor of the panel substrates forming the liquid crystal panels is filled into the connected parts of the liquid crystal panels.

According to this structure, the refraction factor adjusting material having substantially the same refraction factor as the refraction factor of the panel substrates forming the liquid crystal panels is filled into the connected parts of the liquid crystal panels.

It is general that light refracts if the end surface of the panel substrate has a contact to a medium (for example, air) having a different refraction factor when a set of the liquid crystal panels are connected to each other. Also, light refracts or scatters if the end surface of the panel substrate becomes rough as a result of processing, thereby making the joints easy to see.

However, as has been explained, in the sixth liquid crystal display, the refraction factor adjusting material having the same refraction factor as the panel substrates is filled in the connected parts of the liquid crystal panels to eliminate the light refraction or scattering on the end surface of the liquid crystal panels, thereby making it possible to obtain a natural image on which the joints are more difficult to see.

As has been explained, the seventh liquid crystal display of the present invention, which is of the structure of the first, third, fourth, or sixth liquid crystal display, is characterized in that it has an active element in matrix.

According to the above structure, an active matrix type liquid crystal panel using active matrix element, such as a thin film transistor or diode, can be employed as the liquid crystal panel, to reduce the cross talk, thereby enabling high display quality image.

As has been explained, the eighth liquid crystal display of the present invention, which is of the structure of the first, third, fourth, or sixth liquid crystal display, is characterized in that the liquid crystal panels include the panel substrates laminated to each other using a seal material made of an ultraviolet-ray-setting resin. Also, the ninth liquid crystal display of the present invention, which is of the structure of the first, third, fourth, or sixth liquid crystal display, is characterized in that the liquid crystal panels include the panel substrates laminated to each other using a seal material made of a combination of thermosetting and ultraviolet-ray-setting resin.

The ultraviolet-ray-setting resin or combination of thermosetting and ultraviolet-ray-setting resin is used as the seal material for the eighth and ninth liquid crystal displays.

In general, it is known that the seal material around the connected parts of the liquid crystal panels must be placed in the vicinity of the pixel electrode accurately. However, when a thermosetting resin such as an epoxy resin is used as the seal material, the orientation of the liquid crystal fails in a range of some hundreds microns in the vicinity of the seal due to the heat-sagging of the seal material at the time of thermosetting.

However, since the ultraviolet-ray-setting resin or combination of thermosetting and ultraviolet-ray-setting resin is used as the seal material for the eighth and ninth liquid crystal displays, there occurs no heat-sagging, which makes it possible to place the seal material in the vicinity of the pixel electrodes and hence prevent the failure in the orientation of the liquid crystal.

As has been explained, the tenth liquid crystal display of the present invention, which is of the structure of the first, third, or fourth liquid crystal display, is characterized in that a plurality of liquid crystal panels are connected to each other adjacently on a single plane of a signal substrate.

According to this structure, a plurality of liquid crystals are laminated on a signal substrate.

Generally, it is difficult to connect a plurality of liquid crystal panels without causing any gap because of the difference of glass substrates in thickness and the curvature. Further, the liquid crystal panels are scratched at the edge by the pitching or the like when they are processed. These gaps at the connected parts and scratches cause the light scattering, which makes the joints easy to see.

However, in the tenth liquid crystal display, a plurality of liquid crystal panels are laminated to a single substrate as above. As a result, the gaps caused by the difference of glass substrates in thickness and the curvature, or the scratches on the edge of the liquid crystal panels by pitching or the like are not exposed when the viewer sees the image through the substrate side. Thus, a natural image on which the joints are difficult to see can be obtained.

In addition, since the substrate serves as the reinforcing plate when the liquid crystal display is upsized by connecting a set of the liquid crystal panels, the impact resistance can be enhanced, thereby making it possible to obtain a natural image on which the joints are more difficult to see.

Further, as has been explained, the liquid crystal layer sealed in the liquid crystal panel is of a constat thickness, and for this reason, the display is not affected when it is used in a Twist Nematic (TW) liquid crystal display mode.

At the same time, since the tenth liquid crystal display does not demand a polymer dispersed type liquid crystal display mode of the direct sight type, the contrast does not blur, which makes the driving voltage low, thereby saving the power consumption.

As has been explained, the eleventh liquid crystal display, which is of the structure of the first, third, or fourth liquid crystal display, is characterized in that a plurality of liquid crystal panels are connected to each other adjacently on a single plane between two substrates.

The eleventh liquid crystal display is made by providing a plurality of liquid crystal panels between the two substrates. Thus, neither the gaps caused by the difference of glass substrates in thickness and the curvature, or the scratches on the edge of the liquid crystal panels by pitching or the like on the front surface (the side a image is viewed) of the liquid crystal display nor the gaps or scratches on the rear surface (back light side) thereof are exposed.

Thus, light passing through the connected parts of the liquid crystal does not scatter and the polarizing condition does not change, thereby enabling a liquid crystal display which can maintain the black state under the crossed nicol state of the polarizing elements. Accordingly, a more natural image on which the joints are more difficult to see can be obtained.

Also, since the substrates are provided entirely on the front (viewer's side) and rear side (back light side) of the liquid crystal display, the material (bonding agent) used to connect the liquid crystal panels does not lie off from the connected parts of the liquid crystal panels when applied. Thus, light scattering elements including the gaps or irregularities between the surfaces of the bonding agent and liquid crystal panels can be eliminated.

Thus, light passing through the connected parts of the liquid crystal panels does not scatter and the polarizing condition does not change, thereby enabling a liquid crystal display which can maintain the black state under the crossed nicol state of the polarizing elements. Accordingly, a more natural image that does not show the joints more effectively can be obtained.

Also, since the liquid crystal panels connected to each other are sandwiched by two substrates, the strength of the liquid crystal display can be upgraded. Thus, the liquid crystal display can be handled easily even when it is used for a 20- or more inch screen.

As has been explained, the twelfth liquid crystal display, which is of the structure of the second, third, or fourth liquid crystal display, is characterized in that the width of the connected parts of the liquid crystal panels is narrower than the trace width of the first photo-blocking film.

According to this structure, the width of the connected parts of the liquid crystal panels determined to be narrower than the trace width of the first photo-blocking film.

It is general that if the width of the connected parts when connecting a plurality of liquid crystal panels differs considerably compared with the pixel pitch within each liquid crystal panel, the display shows the pixels in a different pitch at the connected parts only, thereby making the display image unnatural and joints easy to see.

However, since the width of the connected parts of the liquid crystal panels determined to be narrower than the trace width of the first photo-blocking film in the twelfth liquid crystal display, the pixel pitch can be made consistent across the entire liquid crystal display, thereby enabling a natural image on which the joints are more difficult to see.

The thirteenth liquid crystal display of the present invention, which is of the structure of the second, third, fourth, tenth, or eleventh liquid crystal display, is characterized in that the first photo-blocking film is made of a photo-absorbing material.

According to this structure, the first photo-blocking film is made of a photo-absorbing material.

When the first photo-blocking film is made of a metal photo-blocking material, such as chromium (Cr) or molybdenum (Mo), the effect of making the joints difficult to see is weakened because of the contrast of the surface reflecting state of the first photo-blocking film to the color of black shown by the connected parts of the liquid crystal panels (crossed nicol state of the polarizing elements).

However, since the first photo-blocking film is made of the photo-absorbing film in the thirteenth liquid crystal display, the surface reflection by the first photo-blocking film can be eliminated, thereby making the joints between the liquid crystal panels more difficult to see.

As has been explained, the fourteenth liquid crystal display of the present invention, which is of the structure of the second, third, fourth, tenth, or eleventh liquid crystal display, is characterized in that the first photo-blocking blocking film is a layered film made of a metal film and a photo-absorbing film.

According to this structure, the first photo-blocking film is a layered film made of the metal film and photo-absorbing film made of an organic or non-organic material.

It is general that the first photo-blocking film made of the organic or non-organic material is inferior to the one made of the metal film in terms of photo-blocking ability, and hence must be 1 μm or more in thickness.

However, since the first photo-blocking film is the layered film made of the metal film and photo-absorbing film in the fourteenth liquid crystal display, a 0.5 μm-thick film can ensure sufficient photo-blocking ability, thereby making the joints between the liquid crystal panels more difficult to see.

As has been explained, the fifteenth liquid crystal display of the present invention, which is of the structure of the thirteenth or fourteenth liquid crystal display, is characterized in that the photo-absorbing film is made of an organic material, or a resin in which particulates are dispersed.

According to this structure, the photo-absorbing film is made of an organic material, or a resin in which particulates are dispersed. Thus, no vacuum device is necessary and the organic material can be applied by printing or spin coat to form the photo-absorbing film, thereby making it easier to form an inexpensive first photo-blocking film.

Pigment such as carbon particulates or semi-conductive particulates such as titanium oxide particulates may be used as t he above-mentioned particulates.

As has been explained, the sixteenth liquid crystal display of the present invention, which is of the structure of the thirteenth or fourteenth liquid crystal display, is characterized in that the photo-absorbing film is made of non-organic materials including the IV-group semi-conductors.

According to this structure, the first photo-blocking film is made of the non-organic material including the IV-group semi-conductors. Thus, although the vacuum device such as a CVD (chemical vapor deposition) must b e used, a first photo-blocking film with a greater photo-absorbing coefficient can be formed compared with the one made of the organic material. Accordingly, the resulting liquid crystal display can retain a sufficient photo-blocking ability and the joints between the liquid crystal panels are made more difficult to see.

As has been explained, the seventeenth liquid crystal display of the present invention, which is of the structure of the fourth liquid crystal display, is characterized in that the third photo-blocking film is made of an elastic photo-absorbing material.

According to this structure, since the third photo-blocking film is made of an elastic photo-absorbing material, the elasticity of the third photo-blocking film absorbs the irregularity, undulation, stress, etc. on the side surface of the connected part side of the liquid crystal panel. Accordingly, the spaces of the connected parts of the liquid crystal panels can be filled completely with ease along the shape of the side surface of the connected part side of the liquid crystal panels.

Thus, the light leakage through the connected parts of the liquid crystal panels can be eliminated completely, and the joints between the liquid crystal panels are made difficult to see. To fill the spaces of the connected parts completely with ease, it is preferable to make the third photo-blocking film out of a photo-absorbing member whose elastic coefficient (Young's coefficient) of $10^4$–$10^8$ N/m$^2$, such as a silicon-based rubber.

As has been explained, the eighteenth liquid crystal display of the present invention, which is of the structure of the seventeenth liquid crystal display, is characterized in that the photo-absorbing material is made of a material whose principal ingredient is a silicon-based rubber.

According to this structure, in addition to the function realized by the seventeenth liquid crystal display, since the photo-absorbing material is made of a material whose principal ingredient is a silicon-based rubber, the third photo-blocking film remains stable in a broad range of temperatures, and renders excellent chemical and aging resistance due to the characteristics of the post-set silicon-based rubber. Thus, the third photo-blocking film can maintain a stable photo-blocking ability even when it is let to stand to have a contact to the other member.

Also, since the silicon-based rubber is in the form of fluid or paste when applied and turned into rubber when being set by the exposure to air, room temperature or slight heating, or irradiation of an ultra-violet ray, the third photo-blocking film can be formed in accurate width and height besides being easy to handle, thereby making an accurate third photo-blocking film easily.

As has been explained, the nineteenth liquid crystal display of the present invention, which is of the structure of the seventeenth or eighteenth liquid crystal display, is characterized in that the photo-absorbing material is mixed with a carbon black pigment.

According to this structure, the photo-blocking ability can be upgraded without degrading the elasticity of the photo-absorbing material by mixing the carbon black pigment into the photo-absorbing material besides the function realized by the seventeenth or eighteenth liquid crystal display.

In conclusion, the structure of the first through nineteenth liquid crystal displays can present a liquid crystal display of the direct size in the multi-screen display method which makes the connected parts of a plurality of liquid crystal panels difficult to see, thereby easily enabling an upsized liquid crystal display.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A liquid crystal display comprising:
   a plurality of interconnected liquid crystal panels connected to each other adjacently on a single surface, each liquid crystal panel including a respective pixel electrode to form a liquid crystal display main body;
   a first polarizing element provided on substantially an entire front surface of said liquid crystal display main body, said first polarizing element having a first polarizing axis; and
   a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable;
   said display further including a photo blocking film disposed perpendicular to said display and configured to substantially block diagonal incident light.

2. The liquid crystal display of claim 1 further comprising a first photo-blocking film which covers a circumference of each pixel electrode in a predetermined trace width.

3. The liquid crystal display of claim 2, wherein a trace width of connected parts of said liquid crystal panels is substantially equal to a trace width of said first photo-blocking film.

4. The liquid crystal display of claim 2, wherein said first photo-blocking film is made of a photo-absorbing film which absorbs light.

5. The liquid crystal display of claim 4, wherein said photo-absorbing film is made of an organic material made of a resin in which particulates are dispersed.

6. The liquid crystal display of claim 4, wherein said photo-absorbing film is made of a non-organic material which includes a IV-group semi-conductor.

7. The liquid crystal display of claim 2, wherein said first photo-blocking film is made of a layered film made of a metal film and a photo-absorbing film which absorbs light.

8. The liquid crystal display of claim 7, wherein said photo-absorbing film is made of an organic material made of a resin in which particulates are dispersed.

9. The liquid crystal display of claim 7, wherein said photo-absorbing film is made of a non-organic material which includes a IV-group semi-conductor.

10. The liquid crystal display of claim 1 further comprising a refraction factor adjusting material having a same refraction factor of panel substrates forming each liquid crystal panel, said refraction factor adjusting material being filled in the connected parts of said liquid crystal panels.

11. The liquid crystal display of claim 10, wherein each of said liquid crystal panels is made of at least one active element in a matrix.

12. The liquid crystal display of claim 10, wherein each of said liquid crystal panels includes panel substrates laminated by means of a seal material made of an ultraviolet-ray-setting resin.

13. The liquid crystal display of claim 10, wherein each of said liquid crystal panels includes panel substrates laminated by means of a seal material made of a combination of thermosetting and ultraviolet-ray-setting resin.

14. The liquid crystal display of claim 1 further comprising a refraction factor adjusting material having a same refraction factor of panel substrates forming each liquid crystal panel, said refraction factor adjusting material being filled in the connected parts of said liquid crystal panels.

15. The liquid crystal display of claim 1, wherein each of said liquid crystal panels is made of at least one active element in a matrix.

16. The liquid crystal display of claim 15, wherein each of said liquid crystal panels includes panel substrates laminated by means of a seal material made of an ultraviolet-ray-setting resin.

17. The liquid crystal display of claim 15, wherein each of said liquid crystal panels includes panel substrates laminated by means of a seal material made of a combination of thermosetting and ultraviolet-ray-setting resin.

18. The liquid crystal display of claim 1, wherein each of said liquid crystal display panels is made of at least one active element in a matrix.

19. The liquid crystal display of claim 1, wherein each of said liquid crystal panels includes panel substrates laminated by means of a seal material made of an ultraviolet-ray-setting resin.

20. The liquid crystal display of claim 1, wherein each of said liquid crystal panels includes panel substrates laminated by means of a seal material made of an ultraviolet-ray-setting resin.

21. The liquid crystal display of claim 1, wherein each of said liquid crystal panels includes panel substrates laminated by means of a seal material made of a combination of thermosetting and ultraviolet-ray-setting resin.

22. The liquid crystal display of claim 1, wherein each of said liquid crystal panels includes panel substrates laminated by means of a seal material made of a combination of thermosetting and ultraviolet-ray-setting resin.

23. The liquid crystal display of claim 1, wherein said plurality of liquid crystal panels are placed on a single plane of a single substrate so as to be connected to each other adjacently.

24. The liquid crystal display of claim 1, wherein said plurality of liquid crystal panels are placed on a single plane of a single substrate so as to be connected to each other adjacently.

25. The liquid crystal display of claim 1, wherein said plurality of liquid crystal panels are placed on a single plane between two substrate so as to be connected to each other adjacently.

26. The liquid crystal display of claim 1, wherein said plurality of liquid crystal panels are placed on a single plane between two substrates so as to be connected to each other adjacently.

27. The liquid crystal display of claim 1, wherein a trace width of connected parts of said liquid crystal panels is substantially equal to a trace width of said first photo-blocking film.

28. The liquid crystal display of claim 1, wherein said first photo-blocking film is made of a photo-absorbing film which absorbs light.

29. The liquid crystal display of claim 28, wherein said photo-absorbing material is made of a material whose principal ingredient is a silicon-based rubber.

30. The liquid crystal display of claim 29, wherein said photo-absorbing material is mixed with a carbon black pigment.

31. The liquid crystal display of claim 1, further comprising a first photo-blocking film made of a layered film made of a metal film and a photo-absorbing film which absorbs light.

32. A liquid crystal display of claim 1, having an arrangement wherein said display further includes a first photo-blocking film which covers a circumference of each pixel electrode in a predetermined trace width;
wherein surface reflecting state of the first photo-blocking film is substantially equal to surface reflecting state of a connected parts of the liquid crystal panels.

33. A liquid crystal display comprising:
a liquid crystal display main body comprising a plurality of liquid crystal panels connected to each other adjacently on a single surface, each liquid crystal display panel including a respective pixel electrode;
a first photo-blocking film which covers a circumference of each pixel electrode in a predetermined trace width;
a third photo-blocking film provided in connected parts of said plurality of liquid crystal panels to fill spaces of said connected parts; and
said third photo-blocking film disposed perpendicular to said display and configured to substantially block diagonal incident light.

34. The liquid crystal display of claim 33 further comprising a refraction factor adjusting material having a same refraction factor of a panel substrate forming each liquid crystal panel, said refraction factor adjusting material being filled in the connected parts of said liquid crystal panels.

35. The liquid crystal display of claim 33, wherein each of said liquid crystal panels is made of at least one active element in a matrix.

36. The liquid crystal display of claim 33, wherein each of said liquid crystal panels includes panel substrates laminated by means of a seal material made of an ultraviolet-ray-setting resin.

37. The liquid crystal display of claim 33, wherein each of said liquid crystal panels includes panel substrates laminated by means of a seal material made of a combination of thermosetting and ultraviolet-ray-setting resin.

38. The liquid crystal display of claim 33, wherein said plurality of liquid crystal panels are placed on a single plane of a single substrate so as to be connected to each other adjacently.

39. The liquid crystal display of claim 33, wherein said plurality of liquid crystal panels are placed on a single plane between two substrate so as to be connected to each other adjacently.

40. The liquid crystal display of claim 33, wherein a trace width of connected parts of said liquid crystal panels is substantially equal to a trace width of said first photo-blocking film.

41. The liquid crystal display of claim 33, wherein said first photo-blocking film is made of a photo-absorbing film which absorbs light.

42. The liquid crystal display of claim 33, wherein said first photo-blocking film is made of a layered film made of a metal film and a photo-absorbing film which absorbs light.

43. A liquid crystal display device of claim 33, wherein said
third photo-blocking film is made of an elastic photo absorbing material.

44. The liquid crystal display of claim 43, wherein said elastic photo-absorbing material is mixed with a carbon black pigment.

45. A liquid crystal display of claim 33, having an arrangement wherein surface reflecting state of the first photo-blocking film is substantially equal to surface reflecting state of the connected parts of the liquid crystal panels.

46. A liquid crystal display comprising:

a plurality of interconnected liquid crystal panels connected to each other adjacently on a single surface, each liquid crystal panel including a respective pixel electrode to form a liquid crystal display main body;

a first polarizing element provided on substantially an entire front surface of said liquid crystal display main body, said first polarizing element having a first polarizing axis; and a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable;

a first photo-blocking film which covers a circumference of each pixel electrode in a predetermined trace width;

a second photo-blocking film which covers an end surface of a connected part side of said liquid crystal panels; and a width d of said second photo-blocking film satisfies $|d| \leq c/\tan(\sin^{-1}(1/n))$, where d is a width of said second photo-blocking film from an end point where said first photo-blocking film is formed on the end surface of the connected part side of said liquid crystal panels to a main surface of said liquid crystal panels, c is a trace width of said first photo-blocking film at the end surface of the connected part side of said liquid crystal panels, and n is a refraction factor of substrates forming each liquid crystal panel.

47. A liquid crystal display comprising:

a liquid crystal display main body comprising a plurality of liquid crystal panels connected to each other adjacently on a single surface, each liquid crystal panel including a respective pixel electrode;

a first photo-blocking film which covers a circumference of each pixel electrode in a predetermined trace width; and a third photo-blocking film provided in connected parts of said plurality of liquid crystal panels to fill spaces of said connected parts wherein a width d of said third photo-blocking film satisfies $|d| \leq c/\tan(\sin^{-1}(1/n))$, where d is a width of said third photo-blocking film from an end point where said first photo-blocking film is formed on the end surface of the connected part side of said liquid crystal panels to a main surface of said liquid crystal panels, c is a trace width of said first photo blocking film at the end surface of the connected part side of said liquid crystal panels, and n is a refraction factor of substrates forming each liquid crystal panel.

48. A liquid crystal display comprising:

a plurality of liquid crystal panels connected to each other adjacently on a single surface, each liquid crystal display panel including a respective pixel electrode;

a first photo-blocking film which covers a circumference of each pixel electrode in a predetermined trace width; and a third photo-blocking film provided in connected parts of said plurality of liquid crystal panels to fill spaces of said connected parts;

said third photo-blocking film is made of an elastic photo-absorbing material;

wherein said elastic photo-absorbing material has an elastic coefficient known as Young's coefficient of $10^4$–$10^8 N/M^2$.

49. A liquid crystal display comprising:

a plurality of interconnected liquid crystal panels connected to each other adjacently on a single surface, each liquid crystal panel including a respective pixel electrode to form a liquid crystal display main body;

a first polarizing element provided on substantially an entire front surface of said liquid crystal display main body, said first polarizing element having a first polarizing axis;

a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable; and said liquid crystal panels including panel substrates laminated by means of a seal material made of a combination of thermosetting and ultraviolet-ray-setting resin.

50. A liquid crystal display comprising:

a plurality of interconnected liquid crystal panels connected to each other adjacently on a single surface, each liquid crystal panel including a respective pixel electrode to form a liquid crystal display main body;

a first polarizing element provided on substantially an entire front surface of said liquid crystal display main body, said first polarizing element having a first polarizing axis;

a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable; and said liquid crystal panels including panel substrates laminated by means of a seal material made of a combination of thermosetting and ultraviolet-ray-setting resin.

51. A liquid crystal display comprising:

a plurality of interconnected crystal panels connected to each other adjacently on a single surface, each liquid crystal panel including a respective pixel electrode to form a liquid crystal display main body:

a first polarizing element provided on substantially an entire front surface of said liquid crystal display main body, said first polarizing element having a first polarizing axis;

a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable; and a first photo-blocking film which covers a circumference of each pixel electrode in a predetermined trace width, said first photo-blocking film is made of a photo-absorbing film which absorbs light.

52. A liquid display comprising:

a plurality of interconnected liquid crystal panels connected to each other adjacently on a single surface, each liquid crystal panel including a respective pixel electrode to form a liquid crystal display main body;

a first polarizing element provided on substantially an entire front surface of said liquid crystal display main body, said first polarizing element having a first polarizing axis;

a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable; and a first photo-blocking film which covers a circumference of each pixel electrode in a predetermined trace width, said first photo-blocking film is made of a layered film made of a metal film and a photo absorbing film which absorbs light.

53. A liquid crystal display comprising:

a plurality of interconnected liquid crystal panels connected to each other adjacently on a single surface, each liquid crystal panel including a respective pixel electrode to form a liquid crystal display main body;

a first polarizing element provided on substantially an entire front surface of said liquid crystal display main body, said first polarizing element having a first polarizing axis; and a second polarizing element provided on substantially an entire rear surface of said liquid crystal display main body, said second polarizing element having a second polarizing axis, said first and second polarizing axes intersecting at right angles wherein lack of electrical interconnection between said plurality of liquid crystal panels facilitates minimizing spacing therebetween and configuration of said first polarizing element and said second polarizing element renders any spacing less noticeable; and a first photo-blocking film which covers a circumference of each pixel electrode in a predetermined trace width, wherein said display further including a first photoblocking film having an arrangement wherein surface reflecting state of said first photo-blocking film is substantially equal to surface reflecting state of a connected parts of said liquid crystal panels.

* * * * *